United States Patent
Gryb et al.

(10) Patent No.: US 10,972,263 B2
(45) Date of Patent: Apr. 6, 2021

(54) SINGLE NODE MULTI-PARTY ENCRYPTION

(71) Applicant: Visa International Service Association, San Francisco, CA (US)

(72) Inventors: Oleg Gryb, San Francisco, CA (US); Sekhar Nagasundaram, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/637,661

(22) PCT Filed: Aug. 31, 2017

(86) PCT No.: PCT/US2017/049722
§ 371 (c)(1),
(2) Date: Feb. 7, 2020

(87) PCT Pub. No.: WO2019/045741
PCT Pub. Date: Mar. 7, 2019

(65) Prior Publication Data
US 2020/0389304 A1 Dec. 10, 2020

(51) Int. Cl.
*H04L 9/08* (2006.01)
*G06F 21/57* (2013.01)
(Continued)

(52) U.S. Cl.
CPC .......... *H04L 9/0869* (2013.01); *G06F 21/575* (2013.01); *G06F 21/6218* (2013.01);
(Continued)

(58) Field of Classification Search
CPC ... H04L 9/0869; G06F 21/575; G06F 21/6218
See application file for complete search history.

(56) References Cited

U.S. PATENT DOCUMENTS 7,907,735 B2 * 3/2011 Fascenda .............. H04L 9/0822
380/278
9,577,829 B1 * 2/2017 Roth ..................... H04L 9/3236
(Continued)

FOREIGN PATENT DOCUMENTS

EP 1587237 10/2005
KR 101743929 6/2017
(Continued)

OTHER PUBLICATIONS

PCT/US2017/049722 , "International Search Report and Written Opinion", dated May 23, 2018, 9 pages.
(Continued)

*Primary Examiner* — Jason Chiang
(74) *Attorney, Agent, or Firm* — Kilpatrick Townsend & Stockton LLP

(57) ABSTRACT

A computer node comprising multiple software modules may receive a cryptographic key from a hardware security module. The computer node may use the cryptographic key to produce two key portions, which are distributed to two software modules. These software modules and an optional additional software module may use the key portions in order to encrypt an initial message. The key portions and their locations in memory are periodically updated in order to provide improved cryptographic security.

18 Claims, 12 Drawing Sheets

(51) Int. Cl.
  *G06F 21/62* (2013.01)
  *H04L 9/14* (2006.01)
(52) U.S. Cl.
  CPC ............... *H04L 9/085* (2013.01); *H04L 9/14* (2013.01); *G06F 2221/2107* (2013.01); *H04L 2209/46* (2013.01)

(56) References Cited

U.S. PATENT DOCUMENTS

| | | | |
|---|---|---|---|
| 2006/0204007 A1* | 9/2006 | Doetzkies | H04N 21/4425 380/221 |
| 2012/0233460 A1* | 9/2012 | Kamara | H04L 9/3218 713/168 |
| 2013/0086393 A1* | 4/2013 | Pogmore | H04L 9/0869 713/189 |
| 2013/0259226 A1 | 10/2013 | Ciet et al. | |
| 2015/0143109 A1* | 5/2015 | Wang | H04L 63/0457 713/160 |
| 2016/0050070 A1* | 2/2016 | Bohli | H04L 9/083 713/168 |
| 2017/0034167 A1* | 2/2017 | Figueira | H04L 63/0428 |
| 2017/0078255 A1 | 3/2017 | Nejadian et al. | |
| 2017/0161732 A1 | 6/2017 | Kurian et al. | |
| 2017/0214521 A1* | 7/2017 | Busch | G06F 21/606 |
| 2018/0053009 A1* | 2/2018 | Claes | G06F 21/602 |
| 2018/0276417 A1* | 9/2018 | Cerezo Sanchez | G06F 21/74 |

FOREIGN PATENT DOCUMENTS

| | | |
|---|---|---|
| WO | 2016135738 | 9/2016 |
| WO | 2017009388 | 1/2017 |

OTHER PUBLICATIONS

Lindell et al., "An Efficient Protocol for Secure Two-Party Computation in the Presence of Malicious Adversaries", 36 pages, Eurocrypt 2007: Proceedings of the 26$^{th}$ annual international conference on Advances in Cryptography, pp. 52-78.

Choi et al., "Efficient Three-Party Computation from Cut-and-Choose", Crypto 2014: Advances in Cryptology, pp. 513-530, Verlag, 38 pages, 2014.

Chow et al., "White-Box Cryptography and An AES Implementation", Lecture Notes in Computer Science, vol. 2595, 2003, pp. 250-270.

Application No. EP17923881.1, Extended European Search Report, dated Aug. 5, 2020, 5 pages.

\* cited by examiner

SINGLE NODE MULTI-PARTY ENCRYPTION

BACKGROUND

Cryptography is increasingly important in maintaining privacy and security in an increasingly connected world. Cryptographic algorithms such as AES allow people to transmit sensitive information safely and securely. Many activities people take for granted, such as online banking, communicating with their doctor over the Internet, or e-commerce are only possible due to cryptography.

However, even the most robust cryptographic methods still present security risks. In recent years, hackers have developed new and sophisticated cryptographic attacks. Furthermore, many of the most secure cryptographic methods, such as multi-party encryption, sacrifice speed and efficiency for security. While hackers may have more difficulty defeating such methods, they are too slow to be useful in real world applications, especially over networks such as the Internet, where latency is an ever present issue.

Embodiments of the invention address these and other problems individually and collectively.

SUMMARY

Embodiments of the invention are directed to methods and systems for multi-party encryption on a single computational node.

One embodiment of the invention is directed to a method. The method comprises receiving, by a computer node comprising a first software module, a second software module, a third software module, and an optional fourth software module, a cryptographic key; generating, by the first software module, a first random number; providing, by the first software module, a first key portion comprising the first random number and an initial message to be encrypted or decrypted to the second software module; providing, by the first software module, a second key portion comprising a value derived from the first random number and the cryptographic key to the third software module; providing, by the second software module to the third software module or the optional fourth software module, a garbled circuit; providing, by the second software module to the third software module or the optional fourth software module, a first garbled value corresponding to the first key portion; providing, by the second software module to the third software module or the optional fourth software module, a garbled message corresponding to the initial message; and applying, by the third software module or the optional fourth software module, the first garbled value, a second garbled value corresponding to the second key portion, and the garbled message as inputs to the garbled circuit to produce a subsequent message corresponding to the initial message.

Another embodiment of the invention is directed to a computer node comprising one or more data processors; and one or more non-transitory computer readable media comprising a first software module, a second software module, a third software module, and an optional fourth software module, the one or more non-transitory computer readable media comprising code, for performing the above method.

Further details regarding embodiments of the invention can be found in the Detailed Description and the Figures.

DETAILED DESCRIPTION

Figure 1:
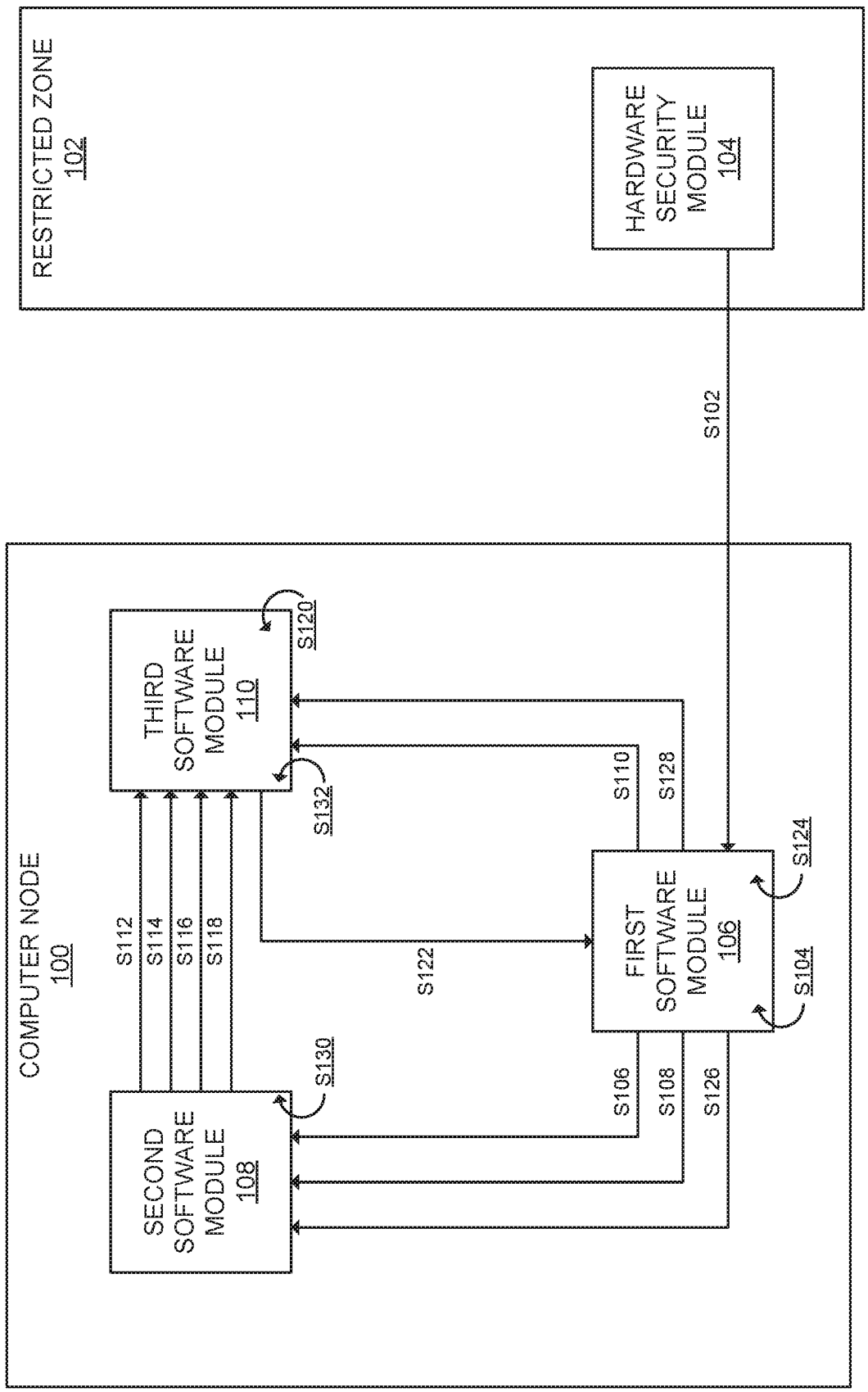
FIG. 1 shows a block diagram depicting a system comprising a computer node with three software modules according to some embodiments of the invention.

Prior to discussing specific embodiments of the invention, some terms may be described in detail.

The term "cryptographic key" may refer to something used in encryption or decryption. A cryptographic key could, for example, refer to a product of two large prime numbers. a cryptographic key may serve as an input in a cryptographic process, such as RSA or AES, and may be used to encrypt plaintext and produce a ciphertext output, or decrypt ciphertext and produce a plaintext output.

The term "plaintext" may refer to text that is in a plain form. For example, this could refer to text which is readable by a human or a computer without any processing, such as the phrase "hello, how are you?" It may also refer to text which is in an unencrypted form. Numbers or other symbols may also qualify as plaintext.

The term "ciphertext" may refer to text that is that is in an encrypted form. For example, this could refer to text which is decrypted before it is readable by a human or computer. Ciphertext may be generated by any number of cryptographic algorithms, such as RSA or AES.

The term "multi-party computation" may refer to a computation which is performed by multiple parties. As an example, a multi-party computation may occur when multiple parties each have some of the required inputs to a computation. For example, one party might know the length of one side of a rectangle and another party may know the length of another side. The two parties could perform a multi-party computation to determine the area of the rectangle.

The term "secure multi-party computation" may refer to a multi-party computation which is secure. In many cases, this refers to a multi-party computation in which the parties do not share information or other inputs with one another. As an example, two parties may wish to know which one of them is more wealthy, without revealing their wealth to each other. The two parties could use a secure multi-party computation technique, such as garbled circuits in order to accomplish this.

The term "noise array" may refer to a block of memory that is filled with "noise" or randomized values. A noise array may be used to make stored data difficult to detect by an outside observer. The noise array may be initialized with random values, and then data can be written to the array at some point or offset. Without knowing the offset, it may be difficult to detect the non-random data stored within the noise array.

Boolean algebra or Boolean logic may refer to a branch of algebra in which the values of the variables are the truth values TRUE and FALSE. The main operations are AND, which returns TRUE only if the two arguments are TRUE, OR, which returns false only if the two arguments are false and NOT, which returns FALSE if the argument is TRUE and returns TRUE if the argument is false. Frequently TRUE and FALSE are represented as 1 and 0 in Boolean logic. Boolean logic is foundational to computing, and underlies Boolean gates and circuits.

A Boolean gate may refer to a device or software that performs a Boolean logic function. Examples of Boolean logic functions are "AND," "OR," "NAND," etc. A Boolean gate may have input wires or terminals and an output wire or terminal. Boolean gates may be constructed out of collections of CMOS transistors, or exist as software.

A Boolean circuit may be a connection of Boolean gates that perform a more complex Boolean logic function. As an example, three Boolean gates could be connected to calculate (A AND B) OR (C AND D). Most functions can be represented or calculated in some way by a Boolean circuit.

A garbled "gate" may be a process or calculation with hidden or "garbled" meaning. A garbled gate may perform a Boolean function, such as the AND function or the OR function. A garbled gate may take in garbled values in order to perform its function. Further, a garbled gate may be represented as an encryption table, by which the garbled values serve as cryptographic keys to "decrypt" the output value of the gate.

A garbled circuit may be a process or calculation with hidden or "garbled" meaning. For example, a mathematical equation or program which performs some function without an observer being able to determine how the function is performed. Garbled circuits may be used in secure multi-party computations in order to calculate the output of a function without revealing the inputs of the function. Garbled circuits may accept garbled values as inputs.

A garbled circuit may be represented as a collection of garbled gates, and may perform complex functions, such as AES encryption. A garbled circuit may be represented as a series of decryption events, whereby each garbled gate in the garbled circuit is decrypted using the garbled values input to that gate as cryptographic keys. The result of the decryption may be the output of the garbled gate, and may be used as a cryptographic key to decrypt another garbled gate. This process may be repeated until the entire circuit is decrypted, producing the output to the garbled circuit.

A garbled value may be a value with hidden or "garbled" meaning. Despite having hidden meaning, a garbled value may still be used as the input to a garbled circuit and produce the correct output which corresponds to the true meaning of the garbled value. A garbled value could, for example, be a random sequence of letters or numbers, such as "ALG."

I. Overview

Embodiments of the invention are directed to systems and methods for performing secure multi-party computation, such as multi-party encryption, on a single computer node. Embodiments of the invention provide for a cryptographic system which is more resilient to certain types of cryptographic attack (such as the "cold boot" attack), while performing encryption or decryption faster than typical multi-party encryption methods, which typically suffer from network latency issues.

In standard multi-party computation methods, multiple computers or servers are in operative communication with one another. Each computer acts as a "party" and they collectively perform some operation together, such as the encryption or decryption of data. The advantage of a multi-party scheme is that it is typically more cryptographically secure than a single computer or server performing cryptographic operations. However, multi-party computation schemes suffer from significant latency issues, as the delay between the computers in the network adds up massively over the course of a computation.

Embodiments of the invention provide for multi-party computation on a single computer node. Rather than computers or servers communicating over a network, embodiments of the invention provide for multiple software modules communicating between one another on a single computer node. This addresses network latency concerns.

Further, embodiments of the invention provide for innovative ways to protect a cryptographic key. A cryptographic key used by embodiments of the invention is rarely accessible. It is preferably only accessible during a start-up or boot stage. At this time, the cryptographic key may be obtained from a hardware secure module. This cryptographic key may be used to produce two key portions which may be distributed among the software modules. These key portions may be used by the software modules to perform cryptographic operations on an initial message while still keeping the key portions isolated from one another. Further, embodiments provide for additional innovations such as "reseeding" key portions and storing them within noise arrays, making the system even more robust and resilient to hacking attempts.

II. Cryptography, Garbled Circuits, and Oblivious Transfer

The following three subsections briefly discuss the concepts of cryptography, multi-party computation, and oblivious transfer.

A. Cryptography Fundamentals and Attacks

Cryptography is a process by which plaintext (unencrypted text) is converted to ciphertext (encrypted text) using an algorithm, often to protect or restrict access to the plaintext. A simple example is "Pig Latin" a system used by children in which the lead consonant is moved to the back of each word and each word is appended with the suffix "ay":

"pig latin→"igpay atinlay"

Cryptography is important in the field of computer science and computer communications. Cryptography enables private messages to be sent over public networks without concern about the messages being intercepted and read by an eavesdropping party. This is particularly important in e-commerce, where a consumer needs to transmit sensitive financial information such as a credit card numbers to a merchant. The consumer's credit card number can be encrypted, transmitted to the merchant, and then decrypted by the merchant. A eavesdropping party or "man-in-the-middle" is unable to determine the credit card number, because it is obfuscated by encryption.

Cryptography methods rely on cryptographic keys. A cryptographic key is a number or set of numbers which is used in order to encrypt a message. Symmetric cryptography methods involve using the same cryptographic key for both encryption and decryption. Asymmetric cryptography, including "public-private key" cryptography, involves using different cryptographic keys for encryption and decryption.

As a simple example, consider encryption and decryption of the message "OK" using an RSA encryption method. First, the message is converted to a number. For the sake of simplicity, each letter will be converted into its corresponding position in the alphabet (A→01, B→02, . . . Z→26), thus:

"OK"→1511

The public cryptographic key in this example will be (n=3233, e=17), the private key will be (n=3233, d=413).

To encrypt the message, calculate:

$$message^e \bmod n$$

$$1511^{17} \bmod 3233 = 2880$$

The encrypted message is thus "2880." Without the proper decryption key, a hacker or other malicious user will be unable to understand the message.

To decrypt the message, simply use the same formula but with the private key:

$$message^d \bmod n$$

$$2880^{413} \bmod 3233 = 1511$$

Then use the conversion method in reverse (01→A, 02→B, ..., 26→Z)

1511→"OK"

These methods work, because it is "computationally infeasible" to determine a cryptographic key, even if the public key is known. This is because cryptographic keys take advantage of math problems for which scientists have not figured out good solutions. For example, there is no known efficient method of determining the prime factors of a large composite number. While people and computers would have no trouble quickly determining the prime factors of 100 (2, 2, 5, 5), determining the prime factors of a large number is much more difficult. Thus, the RSA modulus (3233 in the above example) was chosen to be the product of two prime numbers, 61 and 53.

Typically, hackers do not attempt to calculate or determine the cryptographic key through brute force. Sometimes hackers will attempt to evaluate the memory of the computer system in order to figure out the key. As an example, a hacker may read the memory state of the entire computer or system over a period of time. The hacker may statistically analyze the memory state or the operations of the processor to identify an encryption event. For example, the hacker knows that at some point before performing RSA or another encryption algorithm, the computer or server needs to access memory in order to retrieve the cryptographic key. As keys are typically numbers which are hundreds of bits, or in some cases, hundreds of digits long, the hacker can look for large numbers which are repeatedly accessed over some timeframe. (For example, a merchant processing transactions may encrypt or decrypt thousands of credit card numbers over the course of an hour) The hacker can then "guess and check" using identified or potential cryptographic keys, attempting to decrypt encrypted messages until they find a key which works.

Another example is a "cold boot attack." In a cold boot attack, a hacker turns off power to a computer and then restores power. Computer memory, such as DRAM or SRAM retains values stored in memory for seconds or minutes after a cold boot takes place. The hacker can dump the computer memory to another drive or computer system which the hacker can analyze later to determine the cryptographic key.

There are several methods to reduce the effectiveness of cryptographic attacks, although there are few, if any, one size fits all solutions. A common method is to rotate cryptographic keys, using one key for a period of time before switching to a new one.

Embodiments of the invention provide greater cryptographic security by splitting up a cryptographic key into multiple key portions. These key portions can be each associated with a software module, and hidden in distinct, ever-changing locations in memory. Further, these key portions can be periodically modified by generating random numbers and operating on the key portion using those random numbers. The result is that it is virtually impossible for the hacker to reconstruct the cryptographic key, either via brute force or via memory dumping and analysis.

B. Multi-Party Computation and Garbled Circuits

Multi-party computation is a method by which multiple parties work together to compute a result. For example, consider two people trying to determine the area of a rectangular patio. The first person could measure along one side, and the second person could measure along the other side. The first person could tell their measurement to the second person, and the second person could tell their measurement to the first person. They could each calculate the area of the patio from both measurements and share the result. In this case, multi-party computation is a time-saving technique, rather than having to measure both dimensions, each person only needed to measure a single dimension.

In cryptographic contexts, multi-party computation includes aspects of secrecy. Two parties may wish to co-operate in order to perform some function or algorithm; however, they may not wish to share their inputs with one another. As an example, two people could each have a code to a bank vault, where the bank vault can only be opened if both codes are used. If one person reveals their code to the other person, that person could open the bank vault on their own. Because this presents a security concern, each person wants to be able to open the bank vault without revealing their code to the other person.

The classic multi-party computation problem is "Yao's Millionaire's Problem," whereby two fictional millionaires wish to determine which of them is more wealthy without revealing their wealth to each other. Such "secure multi-party computation" problems can be solved with the use of garbled circuits.

Figure 8:
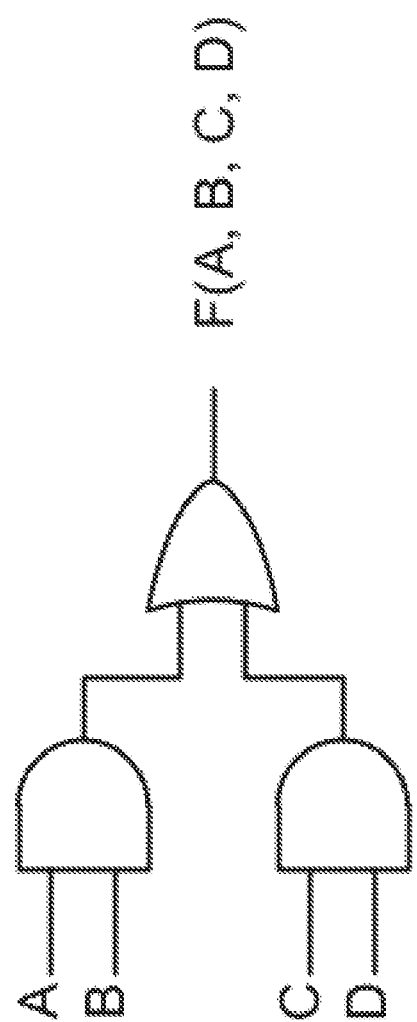
FIG. 8 shows a simple Boolean gate used to explain garbled circuits.

In computer science, a "circuit" generally refers to a computation which could be modeled by a physical circuit, in many cases a Boolean circuit. A Boolean circuit is a series of "logic gates" comprising input wires and output wires, which when fed with inputs produces an output corresponding to a Boolean function. An example of a Boolean gate is the AND gate, which takes two logical inputs (TRUE or FALSE) and returns TRUE if both inputs are TRUE and returns FALSE otherwise. An example of a Boolean function which can be represented as a circuit composed of three gates is F(A,B,C,D)=(A AND B) OR (C AND D). The circuit is shown in FIG. 8.

The variables A, B, C, and D are shown on each wire feeding into the two AND gates. The output of both AND gates feeds into an OR gate, the final output wire has a logical value equal to the function listed above.

Boolean gates can be interconnected into a circuit in order to perform almost any function, including cryptographic functions. A Boolean circuit of roughly 32,000 gates can be used to encrypt or decrypt messages according to the Advanced Encryption Standard (AES), the specification for the encryption of electronic data established by the U.S. National Institute of Standards and Technology.

A garbled circuit is much like a traditional Boolean circuit, except instead each Boolean gate is replaced with a "garbled gate." A garbled gate performs the same function as a Boolean gate, except it the inputs and outputs are "garbled" so that the function cannot be identified.

As an example, consider an AND gate. The "truth table," a table describing the gate's function is produced below. A and B are input wires, and F is the output wire. A value 1 corresponds to TRUE and a value of 0 corresponds to FALSE:

| A | B | F |
|---|---|---|
| 0 | 0 | 0 |
| 0 | 1 | 0 |
| 1 | 0 | 0 |
| 1 | 1 | 1 |

Notably, the value of the output is only 1 or TRUE when the value of both inputs are 1.

To garbled the gate, each value may be replaced with a random number. As an example, A=0 may be replaced with A=23, A=1 may be replaced with A=17, B=0 may be replaced with B=98, B=1 may be replaced with B=2, F=0 may be replaced with F=77, and F=1 may be replaced with F=100:

| A | B | F |
|---|---|---|
| 23 | 98 | 77 |
| 23 | 2 | 77 |
| 17 | 98 | 77 |
| 17 | 2 | 100 |

An observer may be able to determine the AND function performed by this gate by observing a pattern in the rows. The gate can be further garbled by shuffling the rows:

| A | B | F |
|---|---|---|
| 17 | 2 | 100 |
| 17 | 98 | 77 |
| 23 | 2 | 77 |
| 23 | 98 | 77 |

Each garbled gate in a garbled circuit, even those performing the same function can use a different set of random numbers corresponding to its input and output wires. As a result, the garbled circuit will perform the correct function, but the values on the wires at each stage of the garbled circuit cannot be understood by an observer.

Further, the garbled output wire for a garbled gate is usually related to the input wires by a double encryption, where the input wires for that gate are the encryption keys:

| Output wire |
|---|
| $\text{Encrypt}_{17,2}(100)$ |
| $\text{Encrypt}_{17,98}(77)$ |
| $\text{Encrypt}_{23,2}(77)$ |
| $\text{Encrypt}_{23,98}(77)$ |

Where $\text{Encrypt}_{A,B}(F)$ signifies that the value F (in this case, either 100 or 77) is encrypted using A and B as the encryption keys.

This means that a garbled gate can be transmitted between parties as a series of (in this case 4) numbers ($\text{Encrypt}_{17,2}(100)$, $\text{Encrypt}_{17,98}(77)$, $\text{Encrypt}_{23,2}(77)$, $\text{Encrypt}_{23,98}(77)$). To evaluate the gate, the receiving party attempts to decrypt each of the four numbers using their inputs as the encryption keys. In some cases, the outputs are padded with zeroes in order to make the correct decryption more identifiable.

As an example, a receiving party might receive the numbers "12492143", "77843491", "64637872", and "41121099" corresponding to a garbled gate. The receiving party may have garbled values 17 and 2, corresponding to A=1 and B=1. The receiving party attempts to decrypt the four numbers and the table below summarizes the result:

| Encrypted | | Decrypted | |
|---|---|---|---|
| 12492143 | $\text{Encrypt}_{17,2}(100)$ | 00000100 | $\text{Decrypt}_{17,2}(12492143)$ |
| 77843491 | $\text{Encrypt}_{17,98}(77)$ | 23498273 | $\text{Decrypt}_{17,98}(77843491)$ |
| 64637872 | $\text{Encrypt}_{23,2}(77)$ | 84394820 | $\text{Decrypt}_{23,2}(64637872)$ |
| 41121099 | $\text{Encrypt}_{23,98}(77)$ | 13823823 | $\text{Decrypt}_{23,98}(41121099)$ |

The receiving party can see that the first result has been padded with zeroes. Moreover, all the rest of the results appear to be random numbers. Thus, the receiving party can determine that the correct output to the garbled gate is "100." This value can be used as the input to a subsequent garbled gate in a circuit, and so on, until the circuit's function is completed.

The usefulness of a garbled circuit in secure multi-party computation lies in the fact that each party's input can be garbled, such that the other party does not understand the meaning of the input. In this way, both parties can receive the output of the computation without having to reveal their input to the other party.

To summarize, most useful functions can be represented as a Boolean circuit, comprised of Boolean logic gates, such as AND or OR or XOR, etc. Each gate takes in one or more logic values and outputs a logic value. Sufficiently complex Boolean circuits can implement useful functions such as encryption. A garbled circuit can be made of garbled gates, and can be made to implement the same functionality as a corresponding Boolean circuit. The garbled gates replace logic values corresponding to TRUE and FALSE to arbitrary or random numbers. Further, the output of each garbled gate can be encrypted using the corresponding inputs of the garbled gate. To evaluate the garbled circuit, a party decrypts the output of each gate using garbled input values, then uses those outputs as garbled input values to decrypt the outputs of the next layer of gates in the circuit. Eventually the final layer of gates can be decrypted, producing the output of the garbled circuit.

A garbled circuit may also consist of a translation or interpretation table. This table may take the output of the garbled circuit and convert it to a more interpretable form. As an example, a garbled circuit may output a series of bits, corresponding to the outputs of the final layer of garbled gates. These bits may be interpreted by a translation table in order to be represented as a series of letters or numbers. For example, the bit string "1011 1100 1110" may be converted by the translation table to the decimal numbers "11, 12, 13," or to letters, such as "KLM."

Embodiments of the invention use garbled circuits so that the cryptographic key can be split into multiple key portions in order to make compromising the cryptographic key more difficult. Rather than having a single cryptographic key that a hacker might be able to find in memory, the key can be split up into two key portions. Each key portion can be sent to a different software module. When a message needs to be encrypted or decrypted, rather than using the cryptographic key, the software modules can perform a secure multi-party computation using a garbled circuit designed to encrypt or decrypt messages. Because a garbled circuit is used, neither software module can learn the other key portion. This makes it significantly more difficult for a hacker to find the entire key in memory and compromise the security of the system.

C. Oblivious Transfer

Oblivious transfer is a procedure by which a first party may transmit a message to a second party without knowing exactly what message was transmitted. Oblivious transfer is used in some multi-party computation applications. In a secure multi-party computation, several parties will have an input to the computation. For example, if a secure multi-party computation involves determining which of two millionaires (parties) is wealthier (i.e., has more money), each party's input may be the amount of money that millionaire has. This is the purpose of substituting garbled values for input. A natural problem arises in transitioning from the input values (i.e., the amount of money in the millionaire's example) to the garbled values. For example, if the first millionaire generates the garbled circuit, he or she knows the garbled values corresponding to his or her input to the multi-party computation (his or her wealth). However, the second party does not know the garbled values corresponding to their input, because the second millionaire does not know how the garbled circuit was generated. Moreover, the second party can't simply ask for the garbled values corresponding to their input, as that would require the second party to reveal their input to the first party. Essentially, the second millionaire would be revealing how much money they have to the first millionaire, which does not protect the second millionaire's private information.

Oblivious transfer is a solution to this problem, allowing the second party to receive its garbled values from the first party without revealing its inputs to the first party. In embodiments of the invention, discussed in greater detail in Section III, the inputs to the multi-party computation are two key-shares. If any party collects both key shares, a cryptographic key could be reconstructed. This is a security hazard that should be avoided. Oblivious transfer allows the garbled values corresponding to each key-share to be transferred to each party without either party receiving the other party's inputs. Thus neither party can reconstruct the cryptographic key, making the system more secure overall.

There are many variations of oblivious transfer, 1-2 oblivious transfer refers to an oblivious transfer where the receiving party receives one of two messages from the sending party without the sending party knowing which message was received by the receiving party. 1-n oblivious transfer refers to an oblivious transfer process where the receiving party receives one of n messages from the sending party without the sending party knowing which message was received. k-n oblivious transfer refers to an oblivious transfer process where the receiving party receives k of n messages from the sending party.

In 1-2 oblivious transfer, the sending party has two messages $m_0$ and $m_1$. The sending party wants the receiving party to receive one of the messages, but does not want to know which message was received by the receiving party. As an example, message $m_0$ may correspond to one garbled value that may be used in the multi-party computation, and message $m_1$ may correspond to another garbled value that may be used in the multi-party computation. To perform 1-2 oblivious transfer, the sending party wants to encrypt both messages such that only one message can be meaningfully decrypted by the receiving party. The sending party then can send both encrypted messages to the receiving party. The receiving party attempts to decrypt both messages, but will only be able to decrypt one of the messages:

|  | Original | Encrypted by first party | Decrypted by second party |
|---|---|---|---|
| Message 1 | "HELLO" | 12380120 | "HELLO" |
| Message 2 | "GOODBYE" | 84938382 | "FJSLDSL" |

Because the sending party does not know which message the receiving party can decrypt, and because the receiving party can't decrypt the other message, only one message is transferred to the receiving party, such that the first party doesn't know which message was transferred.

Repeated 1-2 oblivious transfer is useful in transferring garbled values corresponding to data represented as binary sequences. In binary, an individual bit is represented as a 1 or a 0. If the receiving party wants to receive the garbled values corresponding to the binary sequence "01011", the receiving party wishes to receive five garbled values, the first corresponding to a "0" in the first position in the sequence, the second correspond to a "1", and so forth. The sending party will send, in sequence, a garbled value corresponding to a "0" without knowing whether it sent a garbled value corresponding to "0" or "1", then a garbled value corresponding to "1" without knowing whether it sent a garbled value corresponding to "0" or "1", and so forth until all garbled values are sent. As most messages can be encoded in binary, 1-2 oblivious transfer may be used to obliviously transfer messages of any length, provided enough repetitions are made.

The following is a detailed example of how this could be accomplished using RSA encryption. Oblivious transfer is not restricted to RSA encryption, numerous other encryption algorithms can be used in an oblivious transfer.

Party one has two messages, $m_0$="NO" and $m_1$="OK." These messages can be thought of as the garbled values corresponding to "0" or FALSE, and "1" or TRUE respectively. Converting these two messages to numbers using the conversion scheme introduced above (A=01, B=02, . . . Z=26):

$m_0$=1415

$m_1$=1511

Party one begins by generating a public-private key pair. For this example, the public key will be (n=3233, e=17), the private key will be (n=3233, d=413).

Party one next generates two random messages, $x_0$ and $x_1$:

$x_0$="AA"="0101"

$x_1$="EE"="0505"

These random numbers are generated so that the second party can "blind" a subsequent encryption. By blinding the encryption, the second party can create an ambiguity that allows for oblivious transfer. The first party won't know which of $x_0$ and $x_1$ was used to blind the encryption, and won't be able to figure out which of two subsequent values is the "correct" value.

The random numbers $x_0$ and $x_1$ and the public key are sent by the first party to the second party.

The second party now generates a random number k, this random number will be blinded with one of the random numbers, encrypted using the public key, and sent back to the first party. For the purposes of this example, k=1234.

The second party selects the random number corresponding to the message the second party wants to receive. For example, if the second party wants the garbled value corresponding to "1" or TRUE, the second party wants message $m_1$. To further clarify, the second party's input to the multi-party computation may be the number "12" represented in binary as "1100." The first garbled value the second party wants is the garbled value corresponding to a "1", and thus wants message $m_1$. This means that the second party selects random number $x_1$. If the second party wanted the garbled value corresponding to FALSE, the second party would select random number $x_0$ corresponding to message $m_0$. In this example, the second party selects $x_1=0505$.

Now the second party blinds k by adding $x_1$ to it, then encrypts the resulting value using the public encryption key:

$$v=(0505+1234^{17}) \bmod 3233=2688$$

This encrypted value, v, is sent back to the first party by the second party.

The first party then attempts to unblind the encrypted value using both random numbers $x_0$ and $x_1$ and decrypt it using the private key (n=3233, d=413):

$$k_0=(v-x_0)^d \bmod n$$

$$k_0=(2688-0101)^{413} \bmod 3233=727$$

$$k_1=(v-x_1)^d \bmod n$$

$$k_1=(2688-0505)^{413} \bmod 3233=1234$$

The value $k_1$ is equal to the original value of k, the value of $k_0$ is not, but the first party does not know this, as the first party never was told the value of k by the second party.

The first party then blinds each message by adding the corresponding value of k, then sends both messages to the second party:

$$m_0'=m_0+k_0=1415+727=2142$$

$$m_1'=m_1+k_1=1511+1234=2745$$

The second party subtracts its value for k from both messages:

$$m_0=m_0'-1234=2142-1234=0908+\text{``}H\text{''}$$

$$m_1=m_1'-1234=2745-1234=1511+\text{``}OK\text{''}$$

The second party now has two messages, one meaningful ("OK") and one meaningless. Thus, the oblivious transfer process was a success, because the second party received one message without the first party knowing which message it received.

To summarize, oblivious transfer is used so that a garbled circuit can be evaluated without either party learning the garbled values of the other party. In the case of 1-2 oblivious transfer using RSA, this is accomplished by blinding a random value k with one of two other random values $x_0$ and $x_1$. The sending party cannot determine k, but can determine two potential values for k, $k_0$ and $k_1$. By adding each value of k to each of the corresponding messages, the first party can send both messages to the second party, such that the second party can only determine the meaning of one of the message by subtracting its known value of k from both messages. Since the second party doesn't know the other potential value for k, it can only determine the meaning of one of the messages.

Embodiments of the invention make use of garbled circuits in order to more effectively secure a key used in symmetric cryptography. Rather than just implementing symmetric cryptography, embodiments of the invention implement symmetric cryptography through the use of a garbled circuit, so that two key portions can be separated, making them more difficult for a hacker or malicious user to find. Oblivious transfer is used in some embodiments so that a software module can receive the garbled values corresponding to its key portion in order to encrypt a message without divulging its key portion to other software modules. The following sections discuss the system and methods according to embodiments of the invention in greater detail.

III. Systems and Methods

The systems and methods according to embodiments of the invention allow multi-party computation on a single computer node. While there are many practical applications for multi-party computation on a single computer node, the discussion below will primarily focus on its applications in symmetric cryptography.

The method enables a single computer node to receive a cryptographic key from a hardware security module located on, in, or operatively coupled to a restricted zone. The first of three or four software modules may produce two key portions from the cryptographic key, each sent to, and hidden within one of the two or three remaining software modules. In this way, a hacker or malicious user is unable to uncover or reconstruct the cryptographic key and compromise the system.

Further, the first of the three or four software modules may transmit an initial message to one of the remaining two or three software modules. The two or three software modules may perform a multi-party computation between them in order to produce a subsequent message from the initial message. As an example, the multi-party computation may be an encryption process, where the initial message is a plaintext message and the multi-party computation involves producing an encrypted message using the key portions as a symmetric key. Additionally, the multi-party computation may be a decryption process, where the initial message is an encrypted or ciphertext message and the multi-party computation involves producing a decrypted or plaintext message using the key portions as a symmetric key.

Figure 2A:
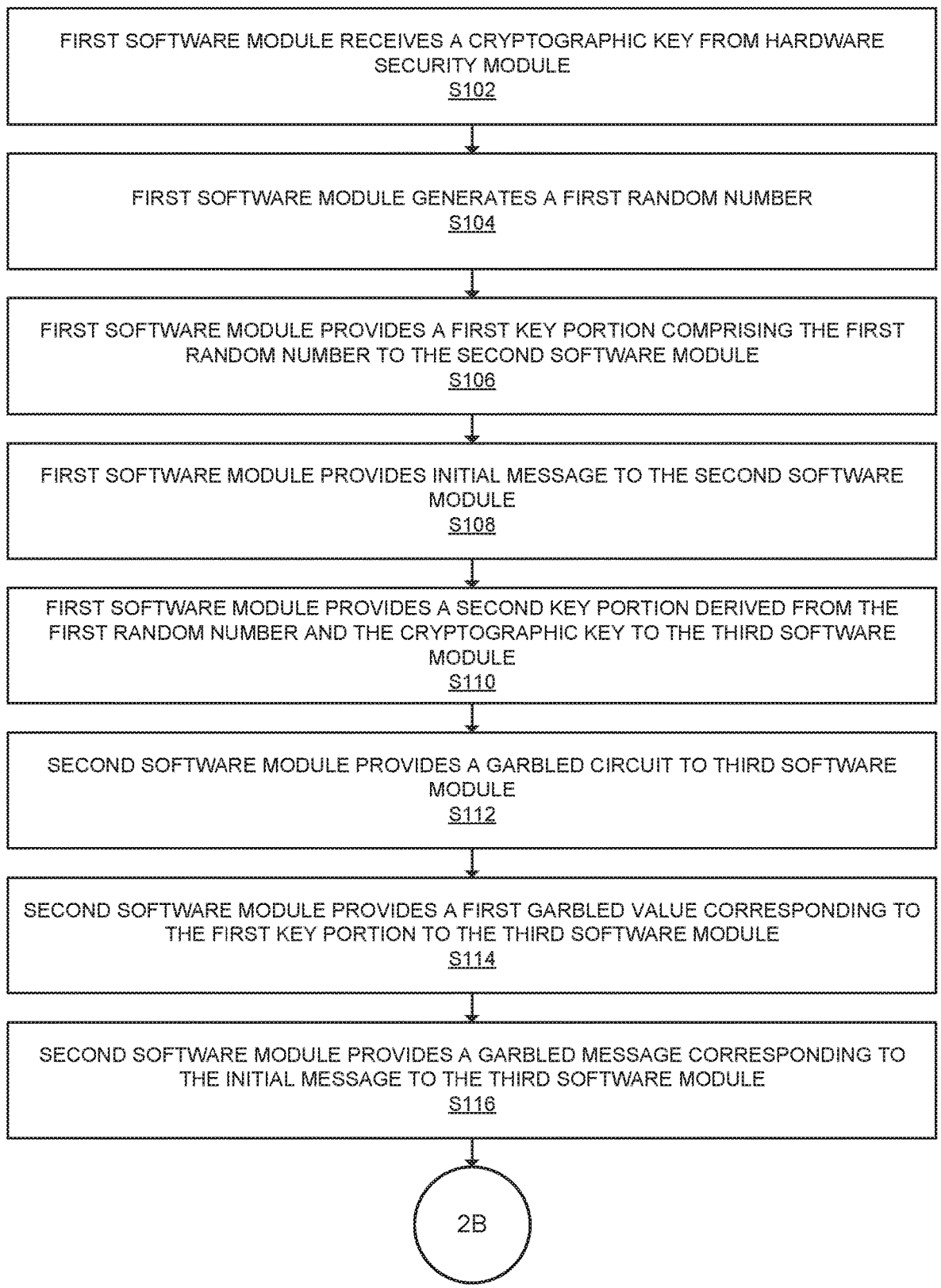
FIGS. 2A, 2B and 2C show a flowchart depicting a two-party computation method accord to some embodiments of the invention.
Figure 2B:
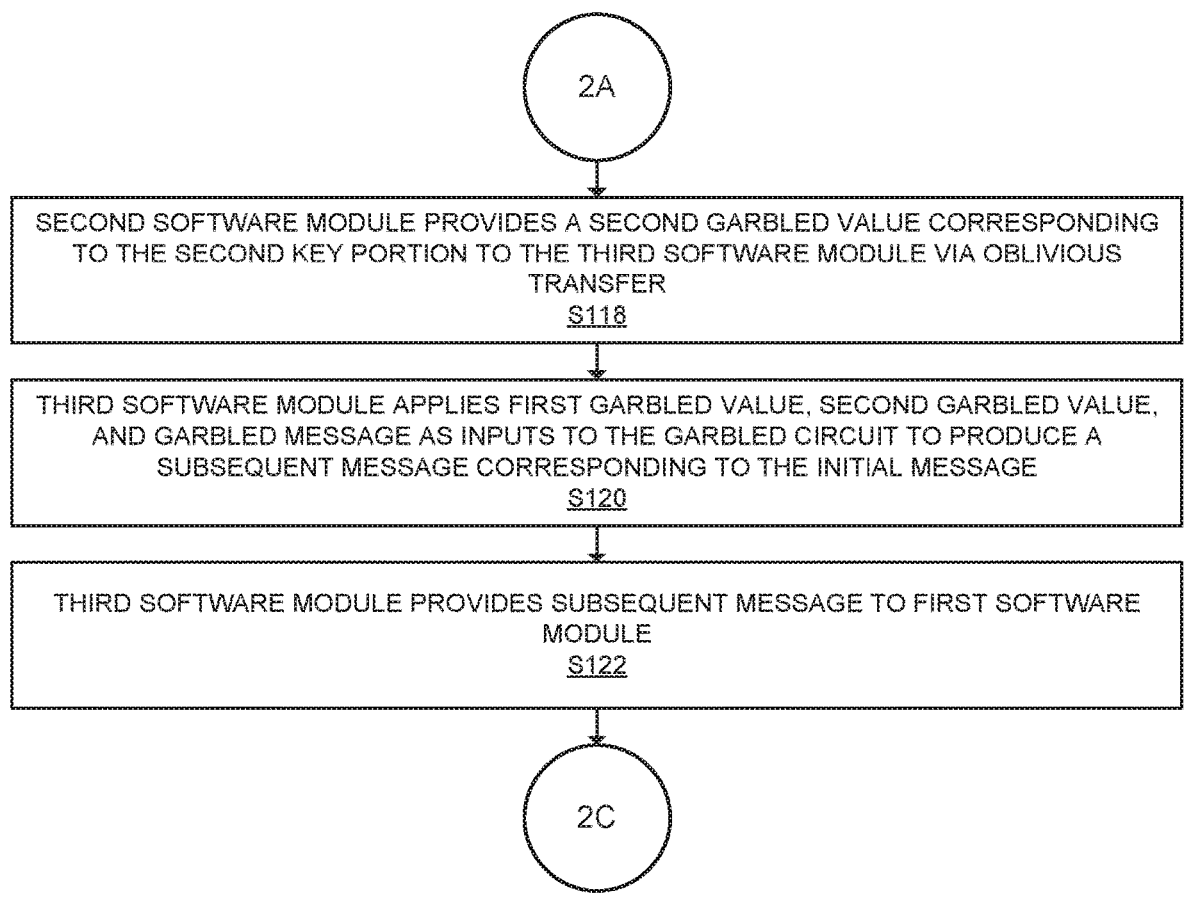
Figure 3:
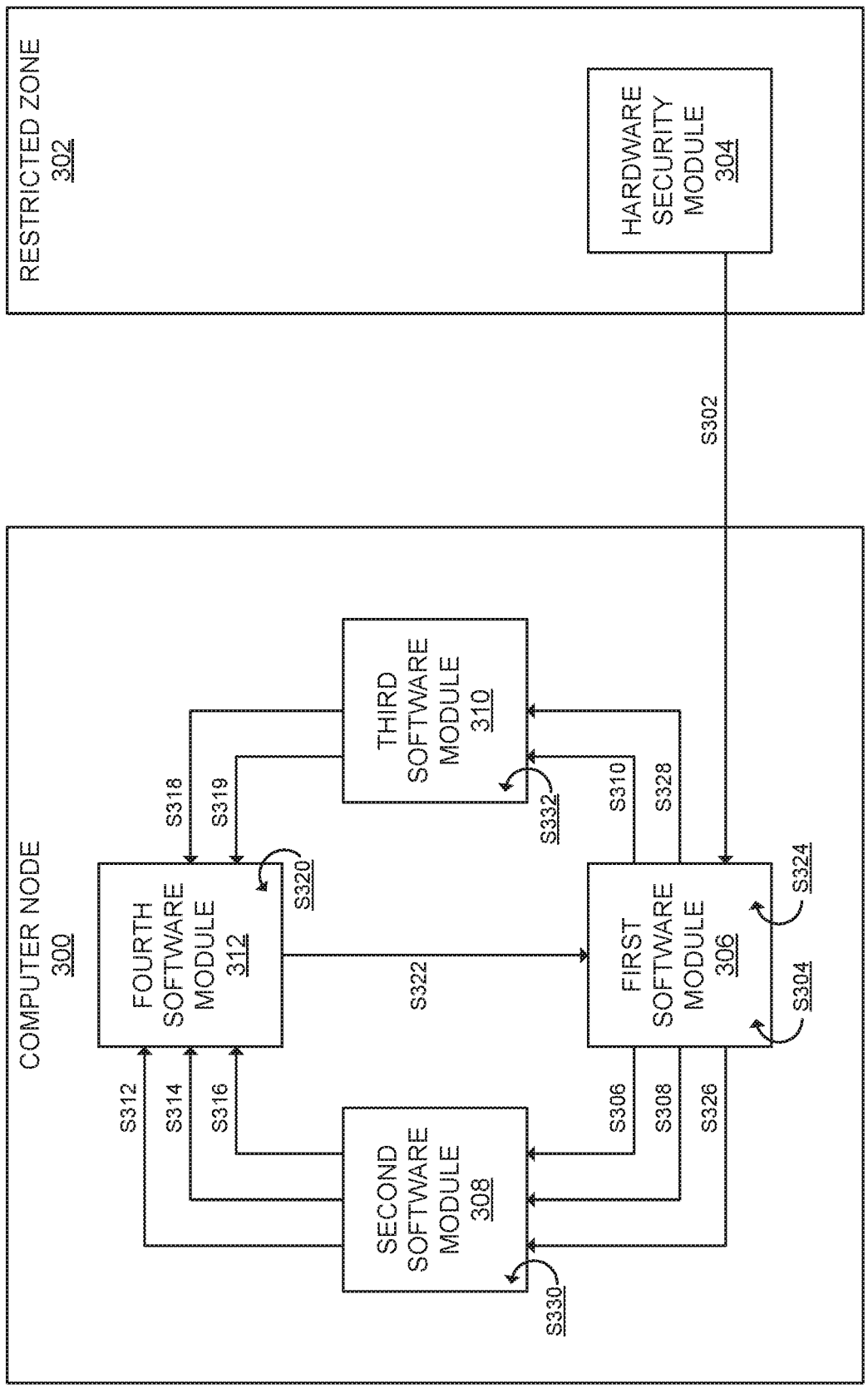
FIG. 3 shows a block diagram depicting a system comprising a computer node with four software module according to some embodiments of the invention.
Figure 4A:
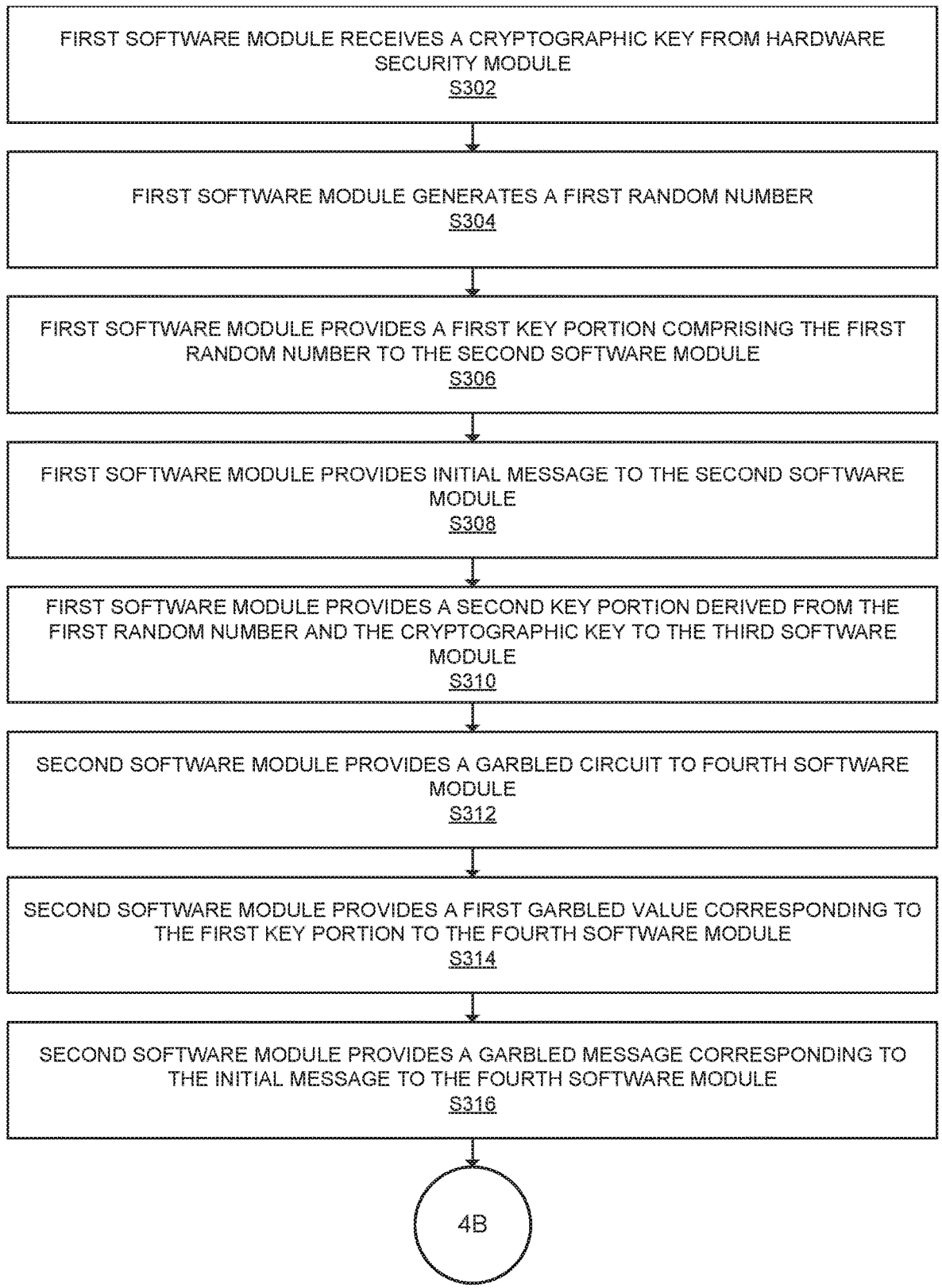
FIGS. 4A, 4B and 4C show a flowchart depicting a three-party computation method according to some embodiments of the invention.
Figure 4B:
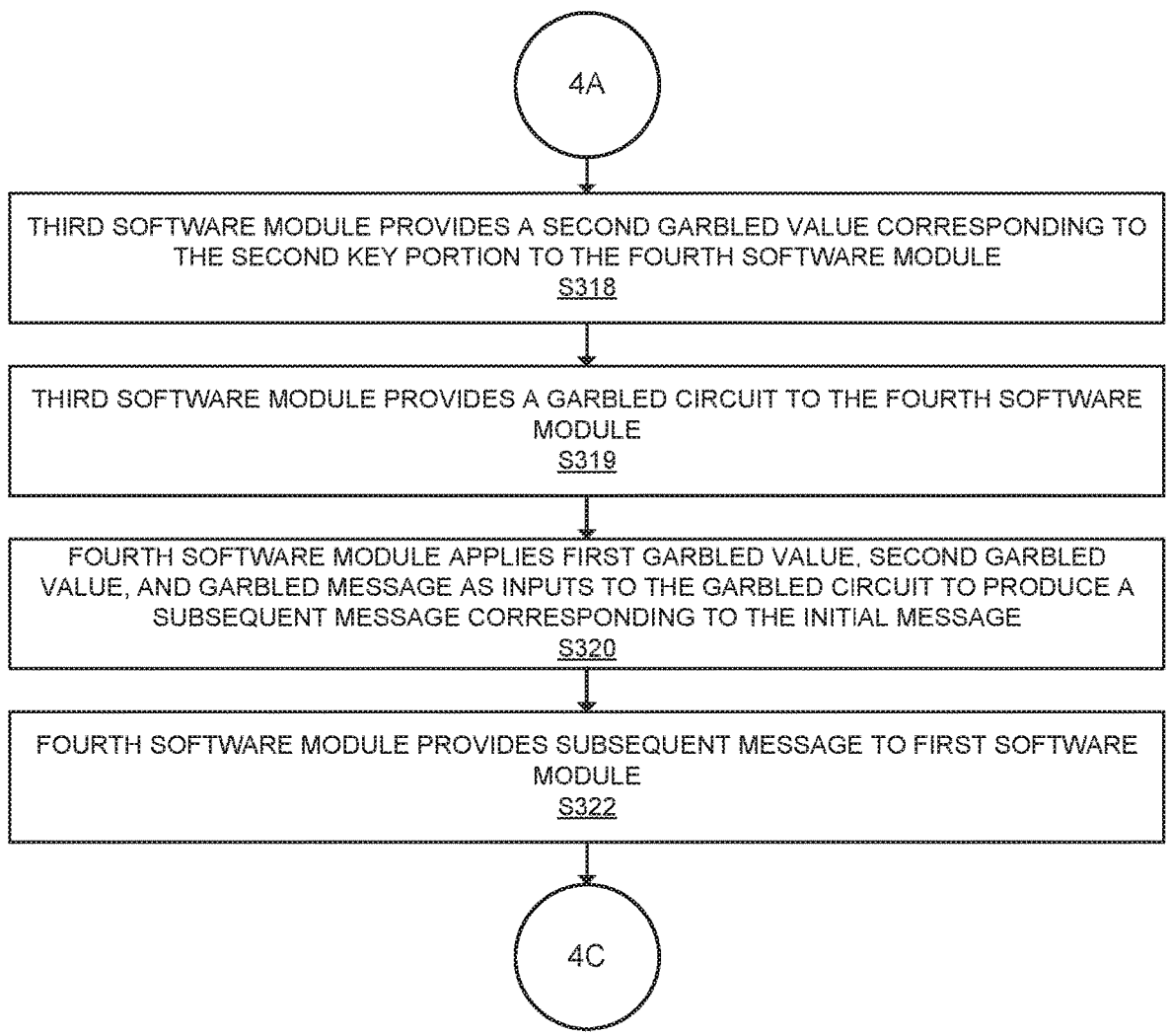

The discussion below focuses primarily on two embodiments of the invention, the first making use of two-party computation, and the second making use of three-party computation. Both embodiments make use of garbled circuits. Two-party computation is shown in FIGS. 1, 2A, and 2B, and discussed below in Subsection A. Three-party computation is shown in FIGS. 3, 4A, and 4B and discussed below in Subsection B.

The method according to the two-party embodiment shares many substantial similarities with the method according to the three party embodiment. One difference is that with the two-party embodiment, a computer node may possess three software modules. With the three-party embodiment, the computer node may possess four software modules. Additionally, the two-party embodiment may make use of oblivious transfer.

A. Two-Party

The following section details the methods and systems for enacting a secure two-party computation, such as symmetric cryptography according to embodiments of the invention.

FIG. 1 shows a computer node 100 comprising a first software module 106, a second software module 108 and a third software module 110. FIG. 1 also shows a restricted zone 102 comprising a hardware security module 104.

The computer node 100 may comprise a single processor or a collection of processors and one or more interfaces that enabling the computer node 100 to communicate with the hardware security module 104 or via other computers or servers over a network. Additionally, the computer node 100 may include a computer readable medium containing software or other code. This computer readable medium may contain the software routines and subroutines which embody the first software module 106, the second software module 108, and the third software module 110. It may also include code that enables the generation of random or pseudorandom numbers, as well as additional memory which may be used by the modules or the computer node 100 itself. More details on the components and structure of the computer node are discussed below in Subsection C and shown in FIG. 5. Steps S102-S132 in FIG. 1 are discussed in detail below with reference to FIGS. 2A and 2B.

The restricted zone 102 may be a computer, server, or other specialized hardware designed to restrict access to a protected resource. In some embodiments, this protected resource may be a cryptographic key. The restricted zone 102 may be designed such that it can only be accessed under a specific set of conditions or only through specific means. For example, the restricted zone 102 may not be connected to the Internet or another network. As a result, any protected information on the restricted zone has to be accessed through a direct connection or via a user terminal.

The restricted zone 102 may further comprise a hardware security module 102. The hardware security module 104 may be a specialized piece of software located in, or operatively coupled to the restricted zone 102. The hardware security module 104 may be a point of contact between the restricted zone 102 and the computer node 100. The hardware security module 104 may be designed such that access to a protected resource, either stored in memory on the hardware security module 104 or elsewhere within the restricted zone 102 may be heavily restricted. For example, the hardware security module may only release a protected resource within a certain time window (such as between 12:00 and 1:00 A.M.), when a password is entered, or for a limited time period after first startup, cold boot, or a hard or soft reset. In some embodiments of the invention, the hardware security module 104 contains a cryptographic key, which may be transferred to the first software module 106 through a secure connection.

The first software module 106 comprises software routines and subroutines which enable a variety of functions. Notably, the first software module 106 is capable of generating random or pseudorandom numbers, performing arithmetic and logical functions, managing memory, and transmitting and receiving data, including cryptographic keys or key portions to and from other software modules. Specifically, the first software module 106 may receive the cryptographic key from the hardware security module 104, generate a first random number and generate two key portions. The first key portion comprising the first random number, and the second key portion comprising an exclusive-or (XOR) of the first random number and the cryptographic key. The first software module may transmit the first key portion to the second software module 108, and transmit the second key portion to the third software module 110.

Additionally, the first software module 106 is capable of receiving an initial message, such as a plaintext message, from a user or from another computer or entity via a network interface. The first software module is further capable of transmitting the initial message to the second software module 108. The first software module 106 is also capable of generating subsequent random numbers and transmitting the subsequent random numbers to both the second software module 108 and the third software module 110. Additionally, the first software module 106 may be capable of managing memory, such as deleting, clearing, or reallocating local memory which may contain the cryptographic key, the first random number, or any subsequent random number.

In some embodiments, the first software module 106 may be able to interface with a user via a user interface or with other computers or servers via a network such as the Internet.

Like the first software module 106, the second software module 108 comprises software routines and subroutines which allow a variety of functions. The second software module 108 is able to receive random numbers and messages from the first software module 106. The second software module 108 is also able to generate a garbled circuit. In some embodiments of the invention, this garbled circuit may enact an encryption algorithm, such as the Advanced Encryption Standard (AES). Additionally, the second software module 108 may generate garbled values corresponding to the inputs of the garbled circuit. These garbled values may include a garbled value corresponding to the first key portion, and a garbled value corresponding to the initial message. The second software module 108 may also contain or comprise code allowing for the transmission of the garbled value, garbled message, and garbled circuit to the third software module 110. Additionally, the second software module may have the capability to perform an oblivious transfer process or algorithm that enables oblivious transfer of garbled values corresponding to the second key portion to the third software module.

Further, the second software module 108 may store the first key portion in a variable location in local memory, and retrieve the first key portion as necessary. The second software module 108 may also contain or comprise code which enables the second software module 108 to update the value of the first key portion using a subsequent random number received from the first software module 106, randomize the local memory, then write the new first key portion at a new location in local memory. This procedure is discussed in greater detail in Subsection D below.

The third software module 110 may contain or comprise code that enables it to receive garbled circuits, garbled messages, and garbled values from the second software module 108. Further, the third software module 110 may comprise code which enables it to enact an oblivious transfer between the second software module 108 and the third software module 110, in order to receive garbled values corresponding to the second key portion. Additionally, the third software module may contain or comprise code allowing the third software module 110 to evaluate garbled circuits using the garbled message, the garbled value corresponding to the first key portion, and the garbled value corresponding to the second key portion.

As with the second software module 108, the third software module 110 may store the second key portion in a variable location in local memory and retrieve the second key portion as necessary. The third software module 110 may also contain or comprise code which enables the third software module 110 to update the value of the second key portion using a subsequent random number received from the first software module 106, randomize the local memory, then write the new second key portion at a new location in local memory.

FIGS. 2A and 2B shows a method 200 for producing a subsequent message from an initial message using a two-party computation. The method will be described below, with reference to FIGS. 1, 2A, and 2B.

Referring to FIG. 1 and FIG. 2A, at step S102, the first software module 106 receives a cryptographic key from the hardware security module 104. This may occur over a wired or wireless connection, and the cryptographic key may be transmitted in any suitable format or via any suitable communication protocol. As examples, the cryptographic key may be transmitted serially, as a stream of individual bits, or as a stream of octets or bytes. The cryptographic key may additionally be transmitted in an encrypted format and decrypted by the computer node 100 or first software module 106. The cryptographic key may typically take the form of a number, such as a product of two large prime numbers, or it may take the form of multiple numbers.

Further, the cryptographic key may be transmitted at or during a restricted time period, or require some authorization or password. This may reduce the risk of the cryptographic key being stolen, leaked, or intercepted during transmission.

In step S104, the first software module 106 generates a first random number. In some embodiments, this may be a pseudorandom number generated by one of many pseudo-random number generation algorithms.

In step S106, the first software module 106 provides a first key portion comprising the first random number to the second software module 108. The provision process may depend on the software or hardware architecture of the computer node 100 or its modules. As an example, each software node may be allocated some range of memory addresses from a shared memory pool. Thus providing the first key portion comprising the first random number to the second software module 108 may involve the first software module 106 copying the random number from a first memory range and writing the random number to a second memory range corresponding to memory allocated to the second software module 108.

In step S108, the first software module 106 provides an initial message to the second software module 108. This initial message may be a plaintext message, and it may be provided to the second software module 108 for the purpose of generating an encrypted message. As with the first key portion, the initial message may be transmitted to the second software module 108 in a variety of ways depending on implementation details of the computer node 100 or the hardware or software architecture.

In step S110, the first software module 106 provides a second key portion comprising or derived from the first random number and the cryptographic key to the second software module 108. This may involve performing a mathematical or logical operation in order to combine the first random number and the cryptographic key. As a single, non-restrictive example, the first random number could be XOR'd with the cryptographic key in order to produce the second key portion. The provision or transmission of the second key portion to the third software module 110 substantially mirrors the provision of the first key portion to the second software module 108 or the initial message to the second software module 108.

In step S112, the second software module 108 provides a garbled circuit to the third software module 110. The garbled circuit can take many different forms. As an example, the garbled circuit could take the form of a series of garbled tables, each corresponding to a garbled gate, wherein each row in the garbled table comprises a garbled gate output doubly encrypted using the inputs of the garbled gate as encryption keys. Providing the garbled circuit to the third software module 110 from the second software module 108 could involve copying the values stored in a series of memory addresses associated with the second software module 108 and writing those values to a series of memory addresses corresponding to the third software module 110.

In step S114, the second software module 108 provides a first garbled value corresponding to the first key portion to the third software module 110. This first garbled value may be used later by the third software module 110 as an input to the garbled circuit in order to perform the functionality of the garbled circuit. The garbled value may typically take the form of a numerical sequence.

In step S116, the second software module 108 provides a garbled message corresponding to the initial message to the third software module 110. Like the first garbled value, this garbled message will be used as an input of the garbled circuit in order to perform its function and evaluate the result. In some embodiments, the output of the garbled circuit may be a ciphertext or encrypted version of a plaintext initial message. In some embodiments, the output of the garbled circuit may be a plaintext or unencrypted version of a ciphertext initial message.

Referring now to FIGS. 1 and 2B, in step S118, the second software module 108 provides a second garbled value corresponding to the second key portion to the third software module 110 via oblivious transfer. As a review, the process of oblivious transfer involves transferring multiple values in such a way that only one value can be meaningfully interpreted by the recipient party. In this way the recipient only receives one meaningful value without the sending party knowing which value the recipient party can understand.

In step S120, the third software module 110 applies the first garbled value, the second garbled value, and the garbled message as inputs to the garbled circuit to produce a subsequent message corresponding to the initial message. In the case of an initial message comprising plaintext, the subsequent message may comprise an encrypted or ciphertext message. In the case of an initial message comprising ciphertext, the subsequent message may comprise a plaintext message.

Evaluation of garbled circuits is discussed above. Generally speaking, evaluation of a garbled circuit involves repeatedly decryption. The garbled message, first and second garbled values are used as keys to decrypt the first "layer" of garbled gates, producing a new set of garbled values. These garbled values are used in turn to decrypt the second layer of garbled gates. This repeats until the final garbled gates are decrypted, the resulting output values correspond to the subsequent message.

In some cases, a translation table may be used to convert the output of the final garbled gates into a different data format. As an example, the final output of the garbled gates may be either a garbled or binary sequence, which may then be converted to an ungarbled sequence or a non-binary sequence.

In some embodiments of the invention, the garbled circuit is implementing an encryption function or algorithm such as AES, thus the resulting output values of the garbled circuit correspond to an encrypted version of the initial message.

In step S122, the third software module 110 provides the subsequent message to the first software module 106. The first software module 106 now possesses an encrypted copy of the initial message. The encrypted message may be sent to other computers on a network, stored for future use, or accessed by a user.

Figure 2C:
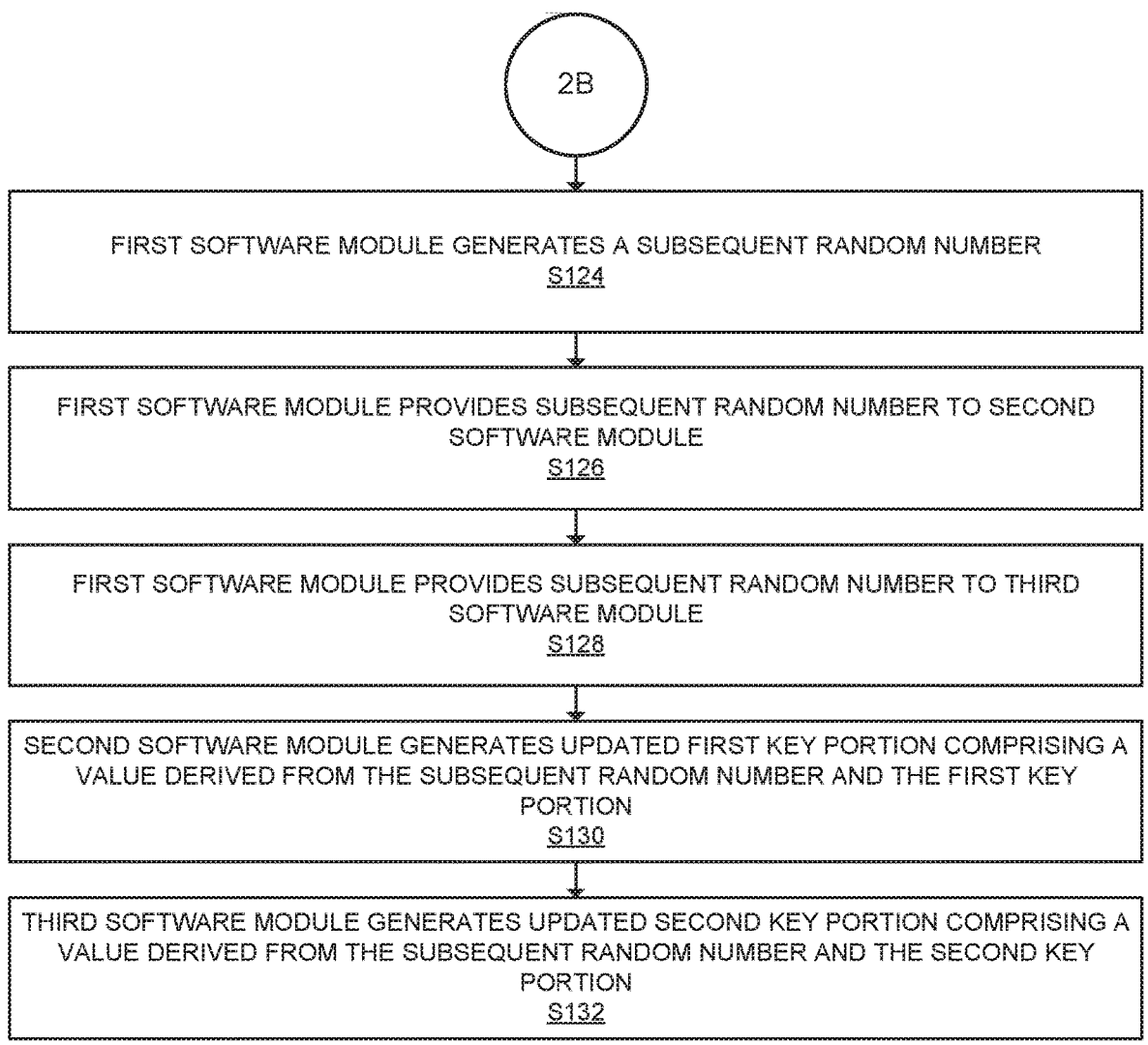

Referring now to FIGS. 1 and 2C, the following steps describe a process of key portion reseeding. Key portion reseeding is discussed in greater detail in Subsection D with reference to FIGS. 6-7. Key portion reseeding does not necessarily immediately follow the steps described above. In some embodiments, the process of key portion reseeding occurs at a predetermined, configured time interval. As examples, key portion reseeding may occur every two hours, every day, every few weeks, or any other unit of time. Additionally, key portion reseeding may occur on an encryption based schedule, such as every encryption event, every three encryption events, etc. Further, key portion reseeding may occur manually. In some embodiments, a human or machine operator may prompt the system to reseed the key portions using the procedure described below and in Subsection D. Thus the following paragraphs describe an example method in which key portions may be reseeded, and are intended to be non-restrictive examples.

In step S124, the first software module 106 generates a subsequent random number. This may occur immediately after the third software 110 module provides the subsequent message to the first software module 106. In some embodiments, a subsequent random number may be generated at a regular rate, such as once every three hours. In other embodiments, a subsequent random number may be generated according to a known schedule, or when an event occurs, such as a user requesting the generation of a subsequent random number.

In step S126, the first software module 106 provides the subsequent random number to the second software module 108. The process of providing the subsequent random number may be substantially similar to providing the first key portion to the second software module 108.

In step S128 the first software module 106 provides the subsequent random number to the third software module 110.

In step S130 the second software module 108 generates an updated first key portion comprising a value derived from the subsequent random number and the first key portion. This may involve the second software module 108 retrieving the first key portion from memory, performing an operation on the first key portion using the subsequent random number, and storing the result in memory as the updated key portion. In some embodiments, the updated first key portion may be equal to the first key portion XOR the subsequent random number.

In step S132 the third software module 110 generates an updated second key portion comprising a value derived from the subsequent random number and the second key portion. This may involve the third software module 110 retrieving the second key portion from memory, performing an operation on the second key portion using the subsequent random number, and storing the result in memory as the updated key portion. Like in step S130, in some embodiments, the updated second key portion may be equal to the second key portion XOR the subsequent random number The process described in steps S124-S132 is part of a process called key portion reseeding, and is discussed in further detail below in Section D with reference to FIGS. 6-7.

B. Three-Party

The following section details the methods and systems for enacting a secure three-party computation, such as symmetric cryptography, according to embodiments of the invention.

One difference between a three-party embodiment and a two-party embodiment is the inclusion of a fourth software module. Rather than the third software module evaluating the garbled circuit, the third software module instead takes on a role similar to the role of the second software module, generating garbled values and optionally garbled circuits and providing garbled values and garbled circuits to the fourth software module. The fourth software module evaluates the garbled circuit and returns the results to the first software module. One advantage of the three-party embodiment is that the key portions are further isolated. The software module evaluating the garbled circuit does not have access to any ungarbled key portion at any time.

FIG. 3 shows a computer node 300 comprising a first software module 306, a second software module 308, a third software module 310, and a fourth software module 312. FIG. 3 also shows a restricted zone 302 comprising a hardware security module 304. FIG. 3 and the computer node 300 are substantially similar to FIG. 1 and the computer node 100. As such, shared or similar components, such as hardware security module 304, the first software module 306, the second software module 308, and the third software module 310 can be understood with reference to FIG. 1. The following paragraphs will primarily discuss notable differences including the fourth software module 312.

In FIG. 3 the computer node 300 may be substantially similar to the computer node 100 in FIG. 1. It may include a computer readable medium containing software or other code. This computer readable medium may contain the software routines and subroutines which embody the first software module 306, the second software module 308, the third software module 310, and the fourth software module 312.

The restricted zone 302 in FIG. 3 may be substantially similar to the restricted zone 102 from FIG. 1, and may be a computer, a server, or other specialized hardware designed to restrict access to a protected resource, such as a cryptographic key.

The hardware security module 304 in FIG. 3 may be substantially similar to the hardware security module 104 in FIG. 1. The hardware security module 304 may be a specialized piece of software or hardware located in, or operatively coupled to the restricted zone 302.

The first software module 306 in FIG. 3 may be substantially similar to the first software module 106 in FIG. 1. The first software module is capable of generating random or pseudorandom numbers, performing arithmetic and logical functions, managing memory, and transmitting and receiving data, including cryptographic keys or key portions to and from other software modules, among other functions.

In FIG. 3, the second software module 308 is capable of providing garbled values, a garbled message, and a garbled circuit to the fourth software module 312 rather than the third software module 310. This is different from the second software module 108 from FIG. 1, which may provide these garbled messages, values and circuits to the third software module 110. In many other respects the second software module 308 is similar to the second software module 108 from FIG. 1.

In FIG. 3, the third software module 310 does not evaluate the garbled circuit using the garbled values and garbled message. Instead, the third software module 310 may provide garbled values corresponding to its garbled input, along with a garbled circuit to the fourth software module 312. In this respect the third software module 310 is similar to the second software module 108 from FIG. 1, in that it performs many of the same or similar functions, including providing garbled values and a garbled circuit to another software module.

The fourth software module 312 may include code that allows the fourth software module 312 to receive garbled values, a garbled message, and a garbled circuit from the second software module 308 and the third software module 310. The fourth software module 312 may additionally contain code or software which enables the fourth software module to evaluate the garbled circuit using the garbled values and garbled message as an input in order to produce a subsequent message. Further, the fourth software module 312 may be capable of providing or transmitting the subsequent message to the first software module 306.

FIGS. 4A and 4B show a method 400 for producing a subsequent message from an initial message using a three party computation. This method will be described below, with reference to FIGS. 3, 4A and 4B. As with FIGS. 1 and 3, FIGS. 4A and 4B share substantial similarities with FIGS. 2A and 2B, and thus FIGS. 4A and 4B can be generally understood with reference to FIGS. 2A and 2B and Subsection A. The following paragraphs will focus primarily on steps shown in FIGS. 4A and 4B that differ from the steps in FIGS. 2A and 2B. Furthermore, some details such as the methods by which data can be transferred between software modules or stored in memory will be omitted, as the examples given in the description of FIGS. 2A and 2B are equally applicable here.

Referring to FIGS. 3 and 4A, in step S302, the first software module 306 receives a cryptographic key from the hardware security module.

In step S304, the first software module 306 generates a first random number.

In step S306, the first software module 306 provides a first key portion comprising the first random number to the second software module 308.

In step S308, the first software module 306 provides an initial message to the second software module 308.

In step 310, the first software module 306 provides a second key portion comprising the first random number and the cryptographic key to the third software module S310.

In step S312, the second software module 308 provides a garbled circuit to the fourth software module 312, rather than the third software module 310 as described in FIG. 2A.

In step S314 the second software module provides 308 a first garbled value corresponding to the first key portion to the fourth software module 312, rather than the third software module 310 as described in FIG. 2A.

In step S316 the second software module 308 provides a garbled message corresponding to the initial message to the fourth software module 312, rather than the third software module 310 as described in FIG. 2A.

Referring now to FIGS. 3 and 4B, in step S318, the third software module 310 provides a second garbled value corresponding to the second key portion to the fourth software module 312.

In step S319, the third software module 310 may optionally provide a garbled circuit to the fourth software module 312. This step provides additional security benefits. The garbled circuit received from the third software module 310 can be compared to the garbled circuit received from the second software module 308. If the garbled circuits don't match, it may suggest that either the second software module 308 or the third software module 310 is compromised. The procedure may be terminated in order to maintain the cryptographic security of the procedure.

In step S320, the fourth software module 312 applies the first garbled value, second garbled value, and garbled message as inputs to the garbled circuit to produce a subsequent message corresponding to the initial message. This comprises the most notable difference between the two-party embodiment and a three-party embodiment; the fourth software module 312, rather than the third software module 310 evaluates the garbled circuit.

In step S322, the fourth software module 312 provides the subsequent message to the first software module 306.

Figure 4C:
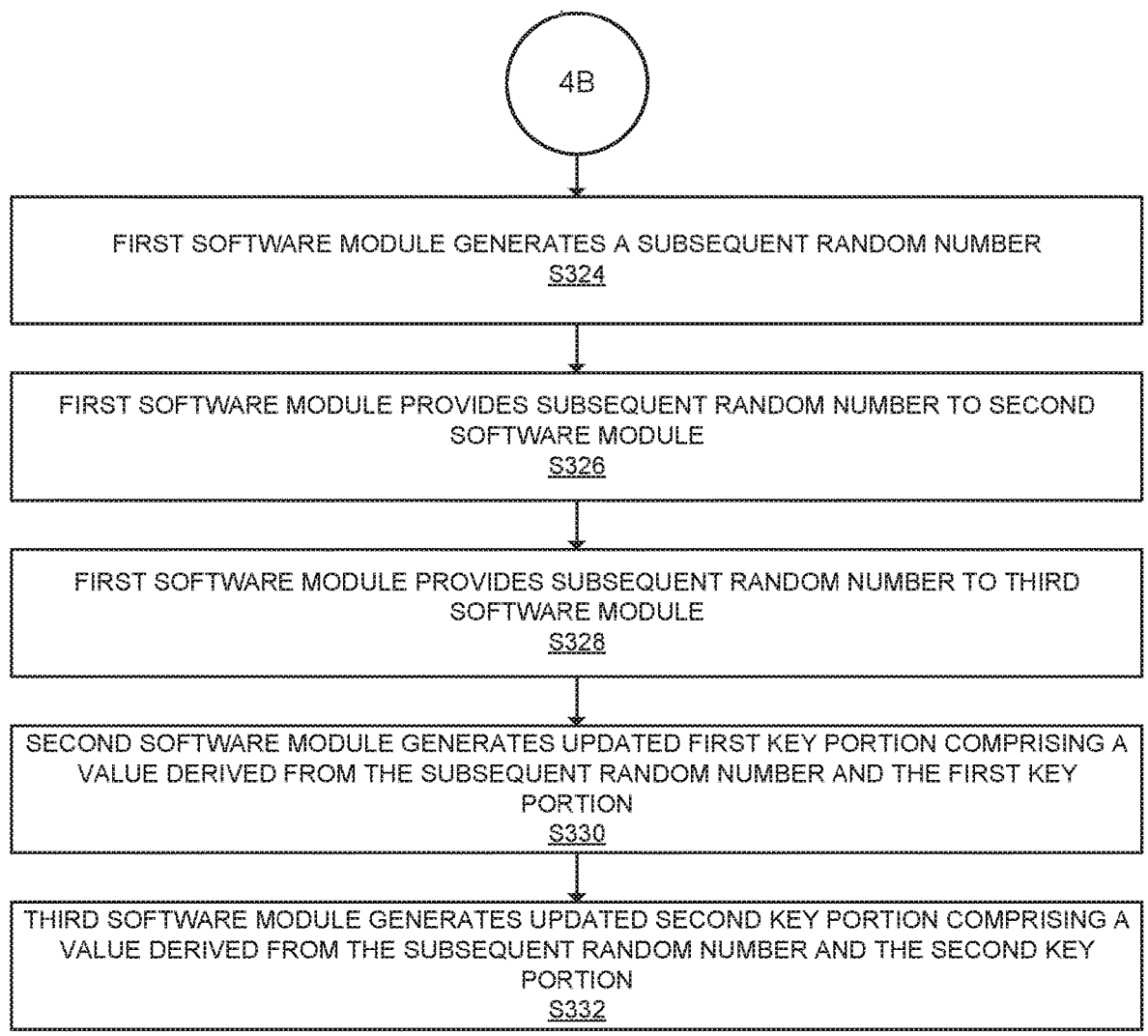

Referring now to FIGS. 1 and 4C, the following steps describe a process of key portion reseeding. Key portion reseeding is discussed in greater detail in Subsection D with reference to FIGS. 6-7. Key portion reseeding does not necessarily immediately follow the steps described above. In some embodiments, the process of key portion reseeding occurs at a predetermined, configured time interval. As examples, key portion reseeding may occur every two hours, every day, every few weeks, or any other unit of time. Additionally, key portion reseeding may occur on an encryption based schedule, such as every encryption event, every three encryption events, etc. Further, key portion reseeding may occur manually. In some embodiments, a human or machine operator may prompt the system to reseed the key portions using the procedure described below and in Subsection D. Thus the following paragraphs describe an example method in which key portions may be reseeded, and are intended to be non-restrictive examples.

In step S324, the first software module 306 generates a subsequent random number.

In step S326, the first software module 306 provides the subsequent random number to the second software module 308.

In step S328, the first software module 306 provides the subsequent random number to the third software module 310.

In step S330, the second software module 308 generates an updated first key portion comprising a value derived from the subsequent random number and the first key portion.

In step S332, the third software module 310 generates an updated second key portion comprising a value derived from the subsequent random number and the second key portion.

Like steps S124-S132 in FIG. 2B, the process described in steps S324-S332 is part of a process called key portion reseeding, and is discussed in further detail below in Subsection D with reference to FIGS. 6-7.

C. Computer Node

The computer node and its hardware and software components will be discussed in greater detail below with reference to FIG. 5.

Figure 5:
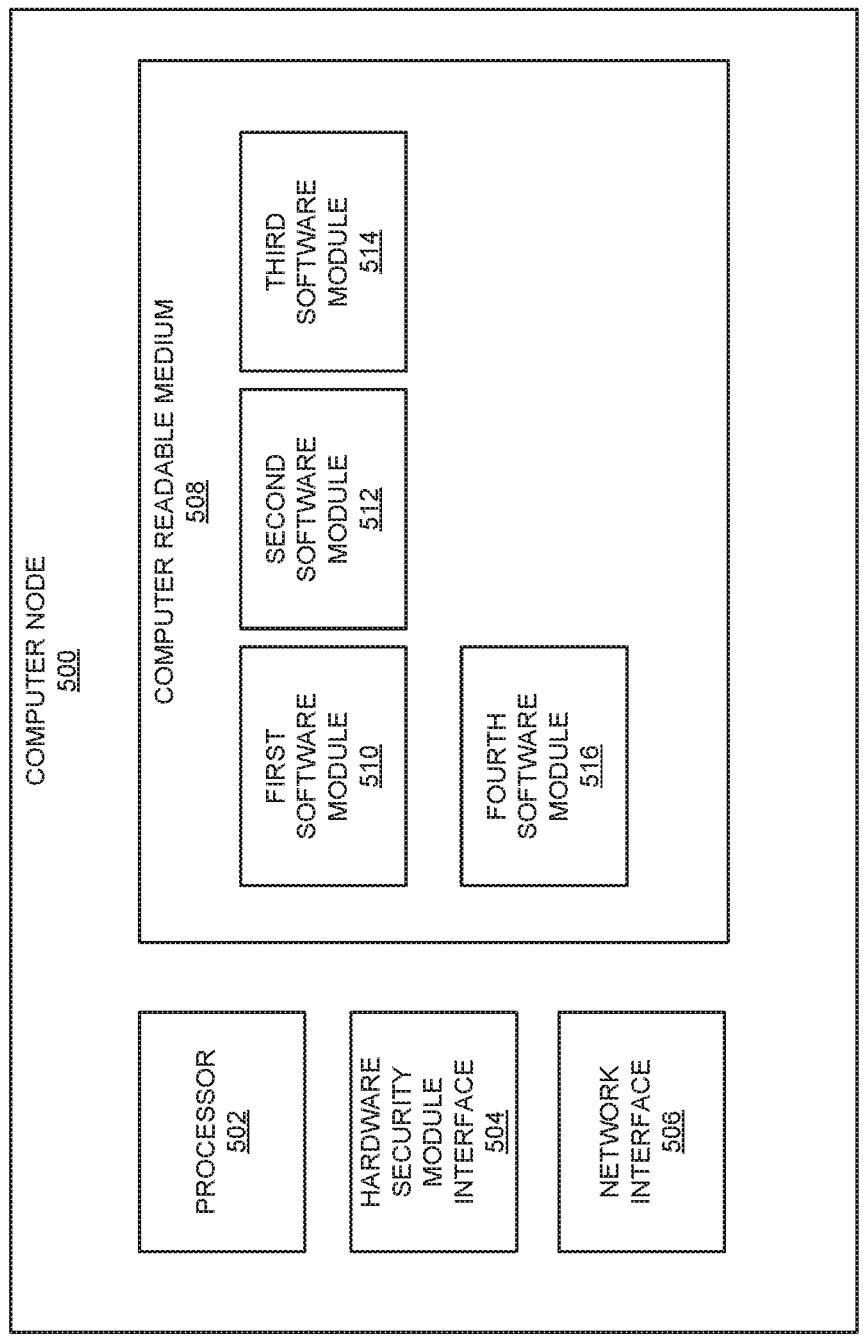
FIG. 5 shows a computer node according to some embodiments of the invention.

FIG. 5 shows a computer node 500, comprising a processor 502, a hardware security module interface 504, a network interface 506, and a computer readable medium 508. The computer readable media contains software modules, including a first software module 510, a second software module 512, a third software module 514, and optionally a fourth software module 516.

The processor 502 may be an electronic circuit which performs operations on data from some data source, such as the computer readable medium 508. The processor 502 may be a single core, multi-core, or a collection of single core or multi-core processors. The processor may make use of a variety of instruction set architectures, such as Reduced Instruction Set Computing (RISC) architectures.

The hardware security module interface 504 may be a physical component, set of instructions, or a hybrid between the two which enables communications between the computer node 500 and a hardware security module. The hardware security module interface 504 may allow secure, protected, and/or encrypted communication with the hardware security module. This may include receiving encrypted communications from the hardware security module, such as an encrypted cryptographic key, and decrypting those communications. It may also involve responding to a challenge message sent from the hardware security module (such as a request for password).

The network interface 506 may be a physical component and set of instructions which enables communication between the computer node 500 and other computers or servers over a network. This may be, for example, an Ethernet interface which enables Ethernet communications with other computers over a network. It may also be any other appropriate interface which allows two devices to communicate with one another, such as an interface for Bluetooth, Wi-Fi, Firewire, USB, HDMI, PS/2, etc.

The computer readable medium 508 may be a hardware element which a computer can read and interpret. Examples include magnetic disk, RAM, SRAM, DDRAM, HDD, SSD, among others. It may have data stored on it which can be interpreted as computer code or software, which can be interpreted by the processor 502 in order to perform some function or operation.

The first software module 510 may comprise code, software, and data necessary to perform the functions associated with the first software module 510. This may include receiving a cryptographic key from the hardware security module, via the hardware security module interface 504. It may also include generating random or pseudorandom numbers, generating first and second key portions based on the cryptographic key and those random numbers, and providing the first key portion to the second software module 512, along with an initial message, and providing the second key portion to the third software module 514. Further, the first software module 510 may be capable of receiving a subsequent message from either the third software module 514 or the fourth software module 516. Additionally, the first software module 510 may be able to communicate with other computers over the network interface, including receiving and sending initial messages or subsequent messages.

As an example, code comprising the first software module 510 may enable the computer node 500 to receive an initial message, such as an unencrypted account number, from a computer over the network interface 506, perform the method according to embodiments of the invention to produce a subsequent message, such as an encrypted account number, then transmit the encrypted account number back to the computer over the network interface 506. As another example, the initial message could be an encrypted account number and the received message could be a decrypted account number.

Additionally the first software module 510 may be able to generate subsequent random numbers and provide those subsequent random numbers to the second software module 512 and the third software module 514.

The second software module 512 may comprise code, software, memory, and data necessary to perform the functions associated with the second software module 512. This may include receiving a first key portion from the first software module 510, generating or otherwise producing a garbled circuit, a garbled value corresponding to the first key portion, and a garbled message, and providing these to either to the third software module 514 or the fourth software module 516. Additionally, the second software module 512 may contain code that enables the oblivious transfer of data between the second software module 512 and the third software module 514. This may include code or other software that enables the second software module 512 to perform cryptographic functions, such as encrypting or decrypting messages according to any number of encryption standards, such as RSA, AES, etc.

Further, the second software module 512 may comprise code, software memory and data necessary to perform the functions associated with key portion reseeding, such as retrieving the first key portion from memory, receiving a subsequent random number from the first software module 510, performing an operation on the first key portion using the subsequent random number to produce a new first key portion, then storing the new second key portion in memory at a new memory address. Key portion reseeding is discussed in greater detail in Subsection D.

The third software module 514 may comprise code, software, and data necessary to perform the functions associated with the third software module 514. This may include receiving a second key portion from the first software module 510, generating or otherwise producing a garbled circuit and a garbled value corresponding to the second key portion, and, in some embodiments, providing these to the fourth software module 516. Additionally, the third software module 514 may contain code that enables the oblivious transfer of data between the third software module 514 and the second software module 512. This may include code or other software that enables the second software module to perform cryptographic functions, such as encrypting or decrypting messages according to any number of encryption standards, such as RSA, AES, etc.

Further, the third software module 514 may contain code or software that enables the evaluation of garbled circuits using garbled values corresponding to the first key portion, garbled values corresponding to the second key portion, and a garbled message. This evaluation may be used to produce a subsequent message, such as an encrypted message, from the above mentioned inputs.

The third software module 514 may additionally be able to provide or transmit the subsequent message to the first software module 510.

Further, the third software module 514 may comprise code, software memory and data necessary to perform the functions associated with key portion reseeding, such as retrieving the second key portion from memory, receiving a subsequent random number from the first software module 510, performing an operation on the second key portion using the subsequent random number to produce a new second key portion, then storing the new second key portion in memory at a new memory address.

The fourth software module 516 may comprise code, software and data necessary to perform the functions associated with the fourth software module 516. This may include receiving a garbled message from the second software module 512, as well as receiving garbled circuits or garbled values from either or both of the second software module 512 and the third software module 516.

Further, the fourth software module 516 may contain code or software that enables the evaluation of garbled circuits using garbled values corresponding to the first key portion, garbled values corresponding to the second key portion, and a garbled message. This evaluation may be used to produce a subsequent message, such as an encrypted message, from the above mentioned inputs. Additionally, the fourth software module 516 may provide the subsequent message to the first software module 510.

D. Key Portion Reseeding

Key portion reseeding is the process by which the first key portion, stored somewhere in a noise array associated with the second software module, and the second key portion, stored somewhere in a noise array associated with the third software module, are updated and stored in a new address in their corresponding noise arrays. This is accomplished by the first software module generating a new random number and transmitting it to both the second and third software modules. The second and third software modules retrieve their corresponding key portions from the noise array, then perform a function on the key portion using the subsequent random number, such as by calculating the exclusive-OR of the key portion and the subsequent random number. The calculated value becomes the new key portion. The noise array is randomized, and the new key portion is written to an offset in the noise array that is proportional or derived from the subsequent random number.

As stated above, in some embodiments of the invention, key portion reseeding may occur at a predetermined, configurable time interval. Examples of such time intervals include every 30 minutes, every hour, every day, every week, etc. In other embodiments, key portions may be reseeded when prompted by a user, such as a human operator. Further, key portions may be reseeded on an encryption event based schedule, such as every thirty encryption or decryption events. Additionally, key portions may be reseeded based on some other form of logic. As an example, the system could determine a threat or safety level, and reseed key portions once the threat or safety level exceeds a certain threshold.

Figure 6:
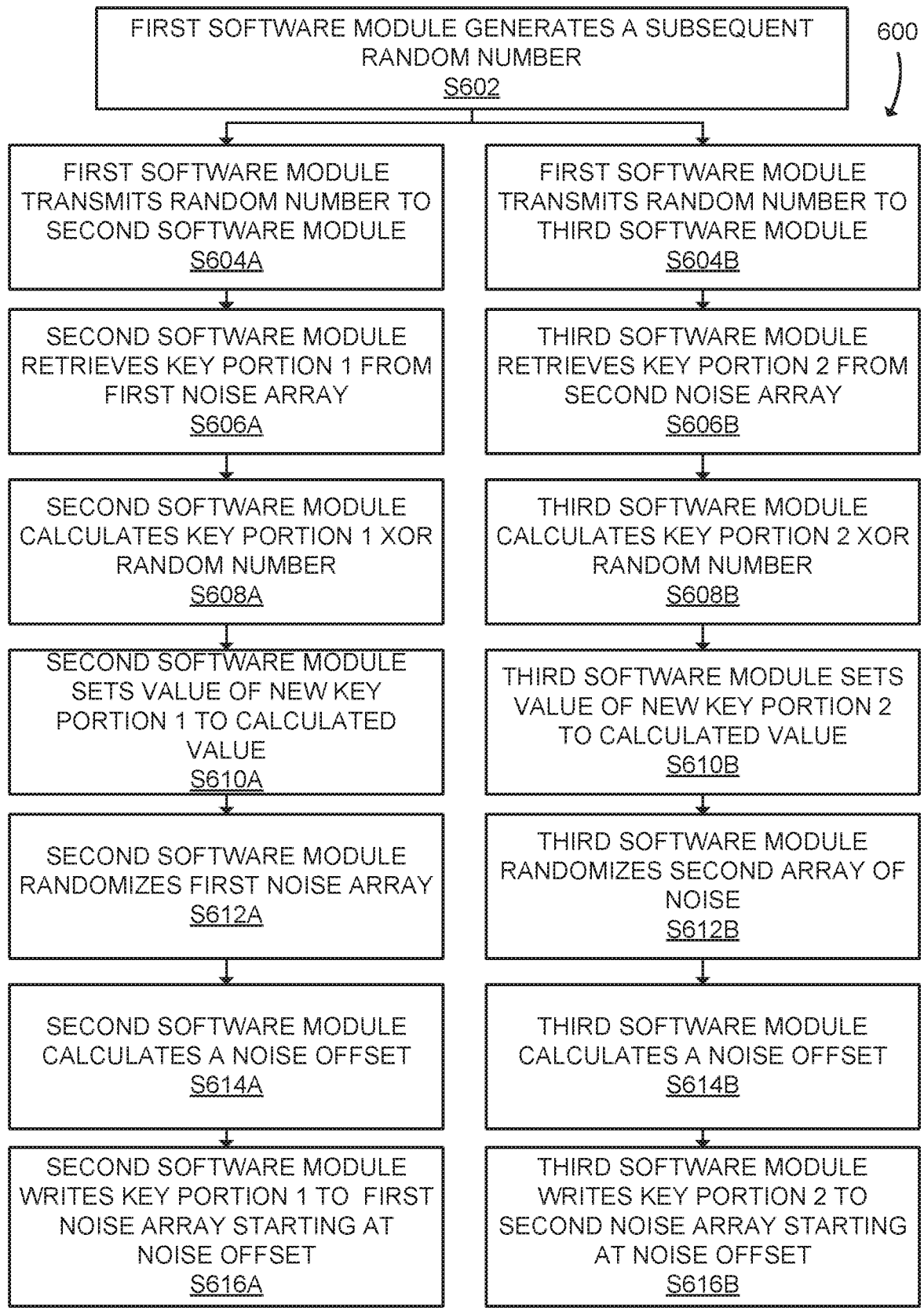
FIG. 6 shows a flowchart detailing a process for key portion reseeding according to some embodiments of the invention.

FIG. 6 shows a method 600 for reseeding key portions according to embodiments of the invention. Steps S604B-S616B are substantially similar to steps S604A-S616A, only regarding the third software module and the second key portion, rather than the second software module and the first key portion. Steps S604A-S616A will be discussed below, and Steps S604B-S616B can be understood with reference to the discussion below and the figure.

In step S602 the first software module generates a subsequent random number. This could be accomplished by any number of random or pseudorandom number generation algorithms.

In step S604A, the first software module transmits the subsequent random number to the second software module.

In step S606A, the second software module retrieves the first key portion from the first noise array. This may involve the second software module having an address stored in memory corresponding to the offset, and reading from the offset address until a certain number of addresses have been accessed. For a first key portion 512 bits long, this may be 512 bits. In some cases, single bits may not be addressable, and the smallest addressable unit may be the byte. In this case, the second software module may, for a first key portion 512 bits long, read 64 consecutive byte addresses, starting at the offset, in order to retrieve the key.

In step S608A, the second software module takes the first key portion and calculates the exclusive-OR of the first key portion and the subsequent random number.

In step S610A, the second software module sets the value of the first key portion equal to the number calculated in step S608A.

In step S612A, the second software module randomizes the first noise array. This may involve sequentially generating random bits or bytes using some form of random number generation and writing them, in turn, to each address in the noise array.

In step S614A, the second software module calculates a noise offset. This offset is the memory address in the array of noise at which the first key portion will be written to. In some embodiments, the noise offset is equal to the value of the random number, modulo the length of the noise array, wherein if the noise offset plus the length of the key portion is greater than the length of the noise array, the noise offset is equal to the length of the noise array minus the length of the key portion:

Offset=(Subsequent Random Number)mod(Array Length)

IF Offset+(Key Portion Length)>(Array Length)

THEN Offset=(Array Length)−(Key Portion Length)

To elaborate, the second software module will not be able to write to memory which sits outside of its allocated range. If the second software module has 100 consecutive memory addresses to work with, it will be unable to write to the 101 memory address. If a key portion is 80 memory addresses long, the noise offset is within the first 20 memory addresses of the noise array. If the noise offset is the $21^{st}$ memory address, the last addressable unit of the key portion will be written to the $101^{st}$ memory address, which is impossible. By calculating the modulus, the second software module guarantees that the noise offset will be within the memory allocated to the noise of the array. By determining if the offset plus the key portion length is greater than the array length, and reducing the offset if it is, the second software module guarantees that the key portion will fit within the memory array.

In step S616A the second software module writes the first key portion to the noise array starting at the noise offset.

Steps S604B-S616B can be understood with reference to the above passages, changing references to the first key portion to the second and references from the second software module to the third.

Figure 7:
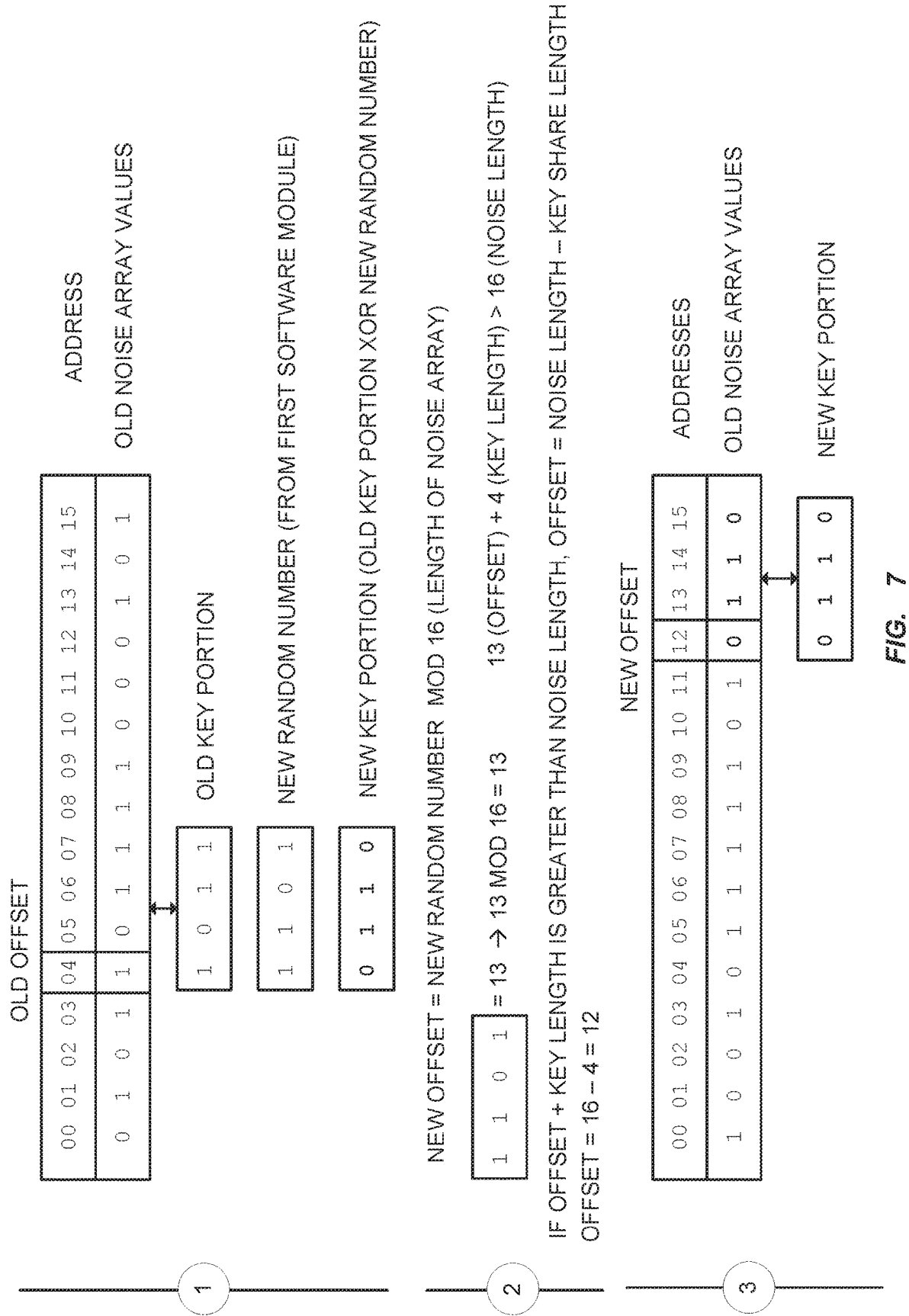
FIG. 7 shows an example of key portion reseeding according to some embodiments of the invention.

FIG. 7 shows an example of key portion reseeding with three graphic indicators.

The first graphic indicator shows how the new key portion is determined. It shows a sequence of 16 memory addresses 00-15. The fifth memory address, 04, is marked as the old offset. Each memory address corresponds to a single bit in this example, with the value of memory addresses 04-07 corresponding to the four bit sequence "1011." This sequence corresponds to an old key portion, such as the first key portion before reseeding. All other memory addresses correspond to random bit values, hence the term "noise," which may refer to random or unpredictable signals or values present in memory. Slightly below is a new random number "1101" that may have been received from the first software module. This new random number is exclusive-ORed with the old key portion to produce the new key portion "0110."

The second graphic indicator shows how the new offset is selected. First, the new random number mod the length of the memory array is calculated. Since the memory array has 16 elements (00-15), the length is 16. "1101" corresponds to a value of 13 in decimal. Since 13 mod 16 is 13, the offset is initially set to 13.

However, if the software module began writing the new key portion to that offset, the fourth digit would have to be written to memory address 16, which doesn't exist. Since the length of the key plus the offset is greater than the total length of the memory array, the offset needs to be shifted backwards so that the key can be written within the memory array. As a result, the offset is set to the memory address 12.

The third graphic indicator shows the newly randomized memory array with the new key portion inserted at the new offset. In this way, both the key portion and its position in memory have changed. This makes the key portion significantly harder for a hacker or malicious user to identify.

Embodiments of the invention have a number of advantages over conventional multi-party computation and encryption schemes. Notably, embodiments of the invention provide for the security of multi-party computation with the speed of single node computation.

By storing key portions in different, changing memory addresses in a noise array, and isolating the key portions within specific software modules, it is significantly harder for a hacker or malicious user to determine the key portions, recreate the cryptographic key, and decode messages. Further, by reseeding the keys using new random numbers, the keys change wildly and unpredictably. It is difficult if not impossible for a hacker to determine what constitutes a key portion.

While conventional methods may use other techniques for protecting cryptographic keys against hackers, these methods usually have downsides or weaknesses. Rotating keys is a common approach, using one key for a period of time then switching to another key. However, rotating a finite number of keys still gives a hacker an opportunity to determine all the keys, given enough time. Embodiments of the method provide for methods and systems for which there is an extremely large number of keys. For example, if the key length is 512 bits, there are roughly $1.34*10^{154}$ pairs of possible key portions. As a point of comparison, there is only an estimated $4*10^{81}$ atoms in the observable universe. Even a conventional system rotating between tens of thousands of unique keys is 150 orders of magnitude less secure than embodiments of the invention. Embodiments of the invention are further resilient to many common attack methods, such as cold boot attacks. Thus embodiments of the invention provide a solution to a computer security problem.

Additionally, embodiments of the invention greatly mitigate the effects of latency on multi-party computation. In a typical multi-party computation scheme, multiple computers perform a multi-party computation over the Internet or another network, rather than on a single computer node. Many processes involved in multi-party computation, such as oblivious transfer, require a large number of communications back and forth between two entities. Oblivious transfer requires at least four messages sent between the first party and the second party, some of which involve moderately large amounts of data, such as a lengthy cryptographic key.

Even under very good network conditions, with latency delays of approximately 10 ms, latency adds a significant amount of time to the total computation. Consider a 1024 bit garbled input, corresponding to a key portions. Four messages have to be sent per 1-2 oblivious transfer per bit, meaning 4096 messages are communicated between the first and second party. At 10 ms per message, 40960 milliseconds, or nearly 41 seconds are required to simply perform the oblivious transfer for a single garbled circuit. This makes multi-party computation virtually useless in many applications because it is far too time consuming. Often times, in applications such as online banking or e-commerce, thousands of messages need to be encrypted per minute. As a result, conventional cryptography applications cannot make use of secure multi-party encryption. By combining multiple parties into a single computer node, embodiments of the invention allow the security benefits of multi-party encryption without the crippling speed losses due to latency.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:
1. A method comprising:
a) receiving, by a computer node comprising a first software module, a second software module, a third software module, and an optional fourth software module, a cryptographic key;
b) generating, by the first software module, a first random number;
c) providing, by the first software module, a first key portion comprising the first random number and an initial message to be encrypted or decrypted to the second software module;
d) providing, by the first software module, a second key portion comprising a value derived from the first random number and the cryptographic key to the third software module;
e) providing, by the second software module to the third software module or the optional fourth software module, a garbled circuit;
f) providing, by the second software module to the third software module or the optional fourth software module, a first garbled value corresponding to the first key portion;

g) providing, by the second software module to the third software module or the optional fourth software module, a garbled message corresponding to the initial message; and h) applying, by the third software module or the optional fourth software module, the first garbled value, a second garbled value corresponding to the second key portion, and the garbled message as inputs to the garbled circuit to produce a subsequent message corresponding to the initial message, wherein the value derived from the first random number and the cryptographic key is an exclusive-OR of the cryptographic key and the first random number.

2. The method of claim 1, wherein the optional fourth software module is not present in the computer node, and wherein the method further comprises:

before step h), sending, by the second software module to the third software module, the second garbled value corresponding to the second key portion using an oblivious transfer process.

3. The method of claim 1, wherein the computer node comprises the fourth software module, and wherein:

in step e) the garbled circuit is provided to the fourth software module, in step f) the first garbled value corresponding to the first key portion is provided to the fourth software module, and in step g) the garbled message is provided to the fourth software module, and wherein the method further comprises:

providing, by the third software module to the fourth software module, the second garbled value corresponding to the second key portion.

4. The method of claim 3, wherein the method further comprises:

providing, by the third software module to the fourth software module, the garbled circuit.

5. The method of claim 1, wherein receiving, by the computer node, the cryptographic key comprises receiving, by the computer node, the cryptographic key from a hardware security module.

6. The method of claim 1, further comprising:

clearing from local memory, the cryptographic key, the first key portion, and the second key portion, by the first software module, after steps a)-d) are performed.

7. The method of claim 1, wherein the initial message is a plaintext message and the subsequent message is the plaintext message in encrypted form.

8. The method of claim 1, the method further comprising:

providing, by the third software module, the subsequent message to the first software module.

9. The method of claim 1, wherein the method further comprises:

generating, by the first software module, a subsequent random number;

sending, by the first software module, the subsequent random number to the second software module and the third software module;

generating, by the second software module, an updated first key portion comprising a value derived from the subsequent random number and the first key portion; and generating, by the third software module, an updated second key portion comprising a value derived from the subsequent random number and the second key portion.

10. A computer node comprising:
one or more data processors; and
one or more non-transitory computer readable media comprising a first software module, a second software module, a third software module, and an optional fourth software module, the one or more non-transitory computer readable media comprising code, for performing a method comprising:

a) receiving, by the computer node, a cryptographic key;

b) generating, by the first software module, a first random number;

c) providing, by the first software module, a first key portion comprising the first random number, and an initial message to be encrypted or decrypted to the second software module;

d) providing, by the first software module, a second key portion comprising a value derived from the first random number and the cryptographic key to the third software module;

e) providing, by the second software module, to the third software module or the optional fourth software module, a garbled circuit;

f) providing, by the second software module to the third software module or the optional fourth software module, a first garbled value corresponding to the first key portion;

g) providing, by the second software module to the third software module or the optional fourth software module, a garbled message corresponding to the initial message; and h) applying, by the third software module or the optional fourth software module, the first garbled value, a second garbled value corresponding to the second key portion, and the garbled message as inputs to the garbled circuit to produce a subsequent message corresponding to the initial message, wherein the value derived from the first random number and the cryptographic key is an exclusive-OR of the cryptographic key and the first random number.

11. The computer node of claim 10, wherein the optional fourth software module is not present in the computer node, and wherein the method further comprises:

before step h), sending, by the second software module to the third software module, the second garbled value corresponding to the second key portion using an oblivious transfer process.

12. The computer node of claim 10, wherein the computer node comprises the fourth software module, and wherein the method further comprises:

in step e) the garbled circuit is provided to the fourth software module, in step f) the first garbled value corresponding to the first key portion is provided to the fourth software module, and in step g) the garbled message is provided to the optional fourth software module, and wherein the method further comprises:

providing, by the third software module to the fourth software module, the second garbled value corresponding to the second key portion.

13. The computer node of claim 10, wherein the method further comprises:

providing, by the third software module to the fourth software module, the garbled circuit.

14. The computer node of claim 10, where in receiving, by the computer node, the cryptographic key comprises receiving, by the computer node, the cryptographic key from a hardware security module.

15. The computer node of claim 10, wherein the method further comprises:

clearing local memory containing the cryptographic key, the first random number, and the value derived from the first random number and the cryptographic key, by the first software module, after steps a)-d) are performed.

16. The computer node of claim 10, wherein the initial message is a plaintext message and the subsequent message is the plaintext message in encrypted form.

17. The computer node of claim 10, wherein the method further comprises:

providing, by the third software module, the subsequent message to the first software module.

18. The computer node of claim 10, wherein the method further comprises:

generating, by the first software module, a subsequent random number;

sending, by the first software module, the subsequent random number to the second software module and the third software module;

generating, by the second software module, an updated first key portion comprising a value derived from the subsequent random number and the first key portion; and generating, by the third software module, an updated second key portion comprising a value derived from the subsequent random number and the second key portion.

* * * * *